(12) United States Patent
Yamamoto et al.

(10) Patent No.: US 6,704,466 B1
(45) Date of Patent: Mar. 9, 2004

(54) IMAGE SEARCH SYSTEM, IMAGE SEARCH APPARATUS, CONTROL METHOD THEREOF, AND COMPUTER READABLE MEMORY

(75) Inventors: Kunihiro Yamamoto, Yokohama (JP); Kentaro Matsumoto, Higashikurume (JP); Kiyoshi Kusama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/384,968

(22) Filed: Aug. 30, 1999

(30) Foreign Application Priority Data

Aug. 31, 1998 (JP) ............................................. 10-244581
Aug. 31, 1998 (JP) ............................................. 10-244584
Aug. 31, 1998 (JP) ............................................. 10-244587

(51) Int. Cl.$^7$ .............................. G06K 9/54; G06F 17/30

(52) U.S. Cl. ............................. 382/305; 382/304; 707/3

(58) Field of Search ................................. 382/162, 163, 382/165, 167, 274, 284, 305, 181, 304, 190, 191, 192, 195; 707/1–8, 502; 345/348, 700, 759, 770

(56) References Cited

U.S. PATENT DOCUMENTS

| | | | | |
|---|---|---|---|---|
| 5,038,298 | A | 8/1991 | Matsumoto et al. | 364/518 |
| 5,157,773 | A | 10/1992 | Matsumoto et al. | 395/375 |
| 5,220,625 | A | * 6/1993 | Hatakeyama et al. | 345/809 |
| 6,181,818 | B1 | * 1/2001 | Sato et al. | 382/170 |
| 6,247,009 | B1 | * 6/2001 | Shiiyama et al. | 707/3 |
| 6,400,853 | B1 | * 6/2002 | Shiiyama | 382/305 |

* cited by examiner

*Primary Examiner*—Bhavesh M. Mehta
*Assistant Examiner*—Kanji Patel
(74) *Attorney, Agent, or Firm*—Fitzpatrick, Cella, Harper & Scinto

(57) ABSTRACT

First control controls execution of a process for inputting an image drawn by the user using an input window, and a process for computing the image feature amount of the input image. Parallel to the first control, second control controls execution of a process for storing a plurality of image data in correspondence with their image feature amounts, a process for computing image similarity on the basis of the computed image feature amount and those of the stored image data, and a process for displaying a list of image data as search results on the basis of the computed image similarity. Also, communications between the first control and the second control are controlled.

16 Claims, 14 Drawing Sheets

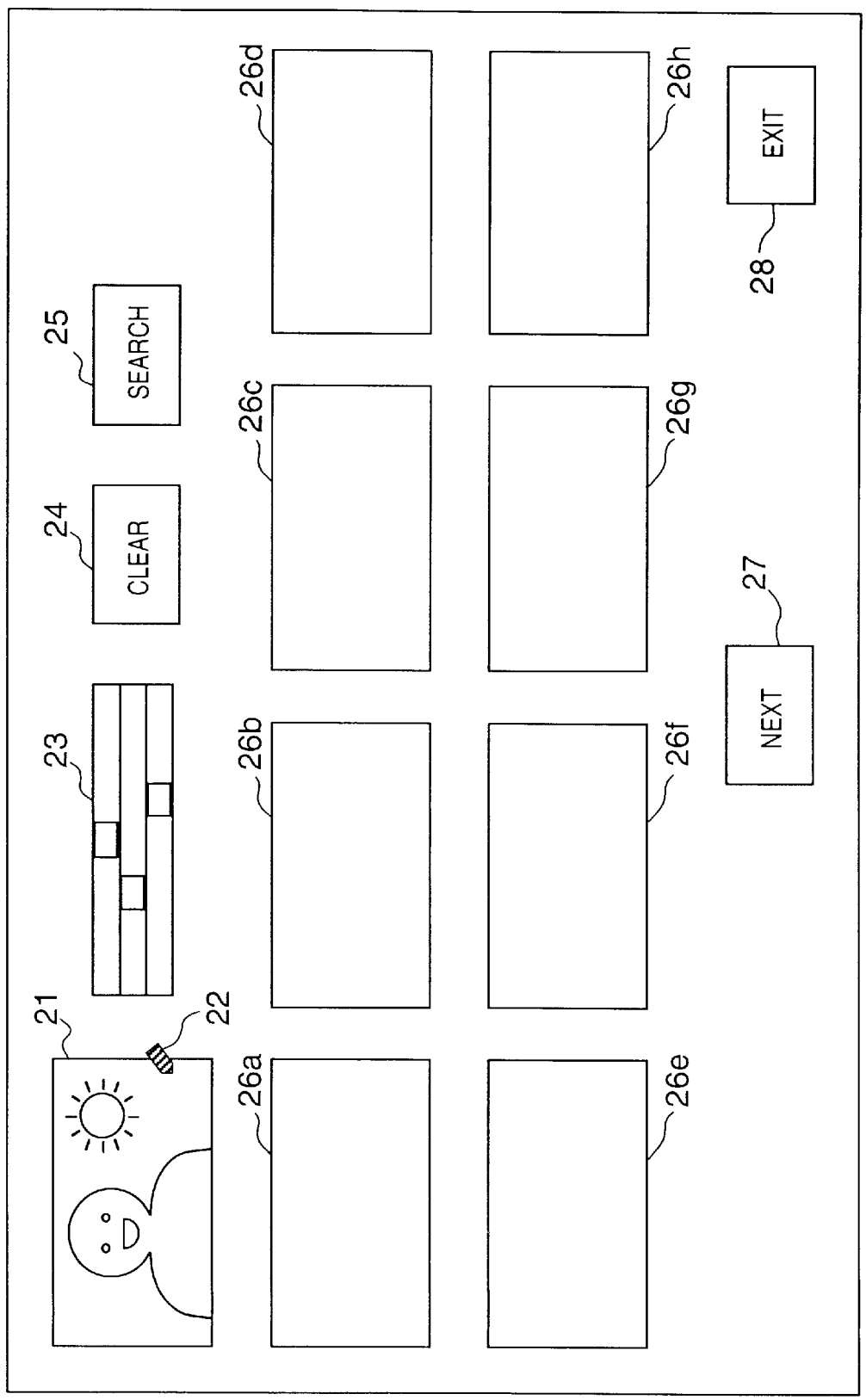

PROCESS A

PROCESS B

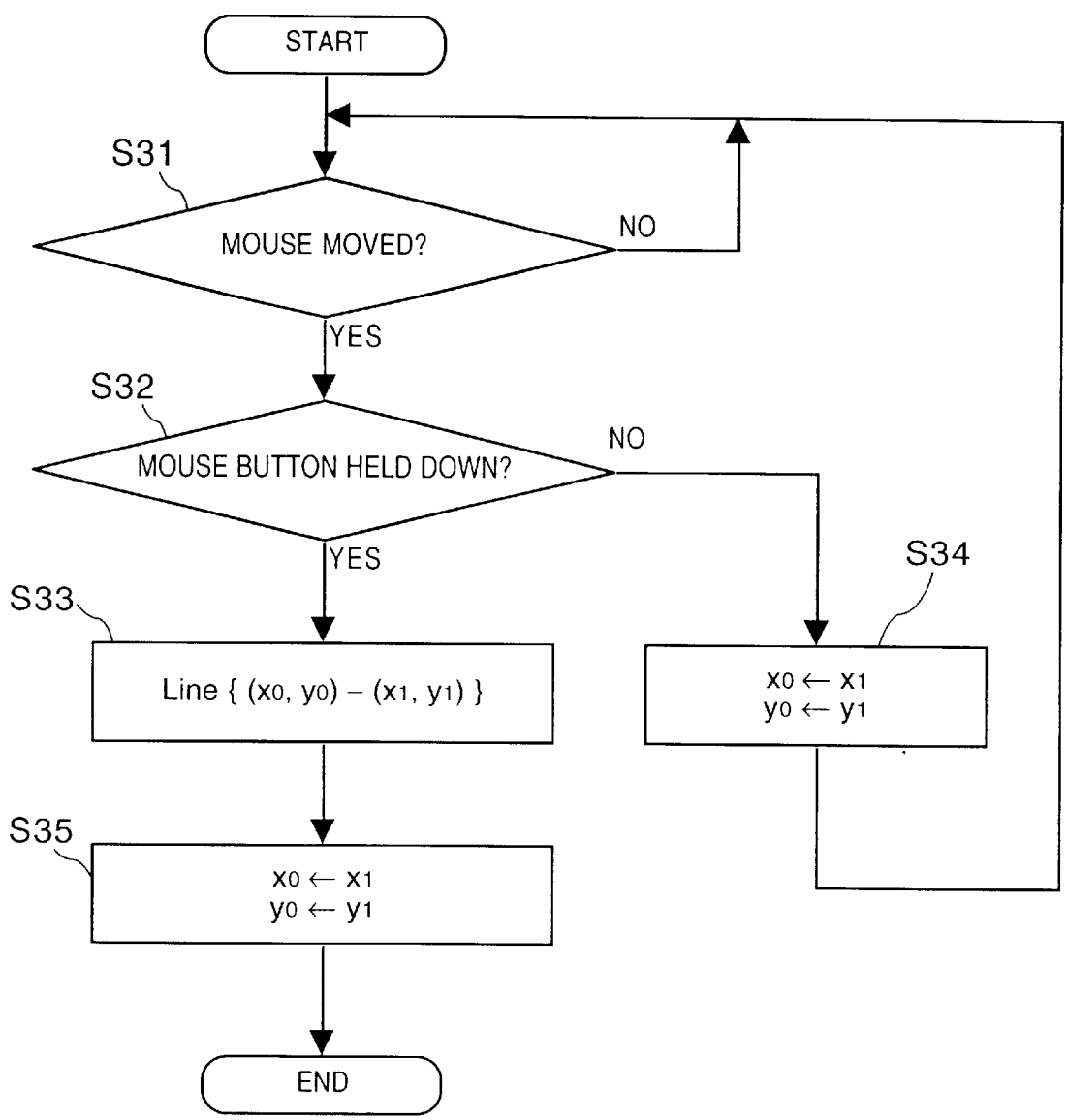

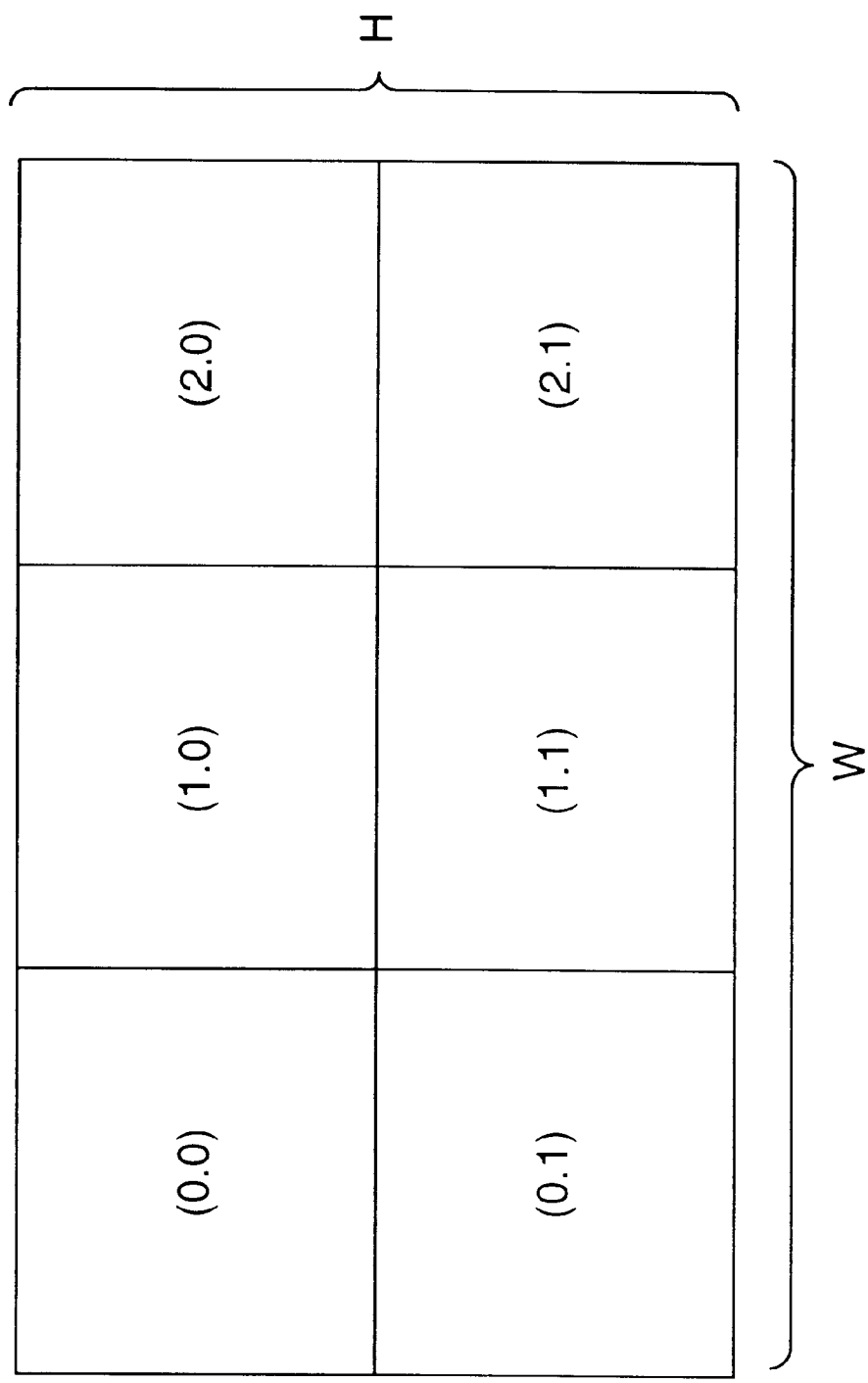

PROCESS B1

PROCESS C1

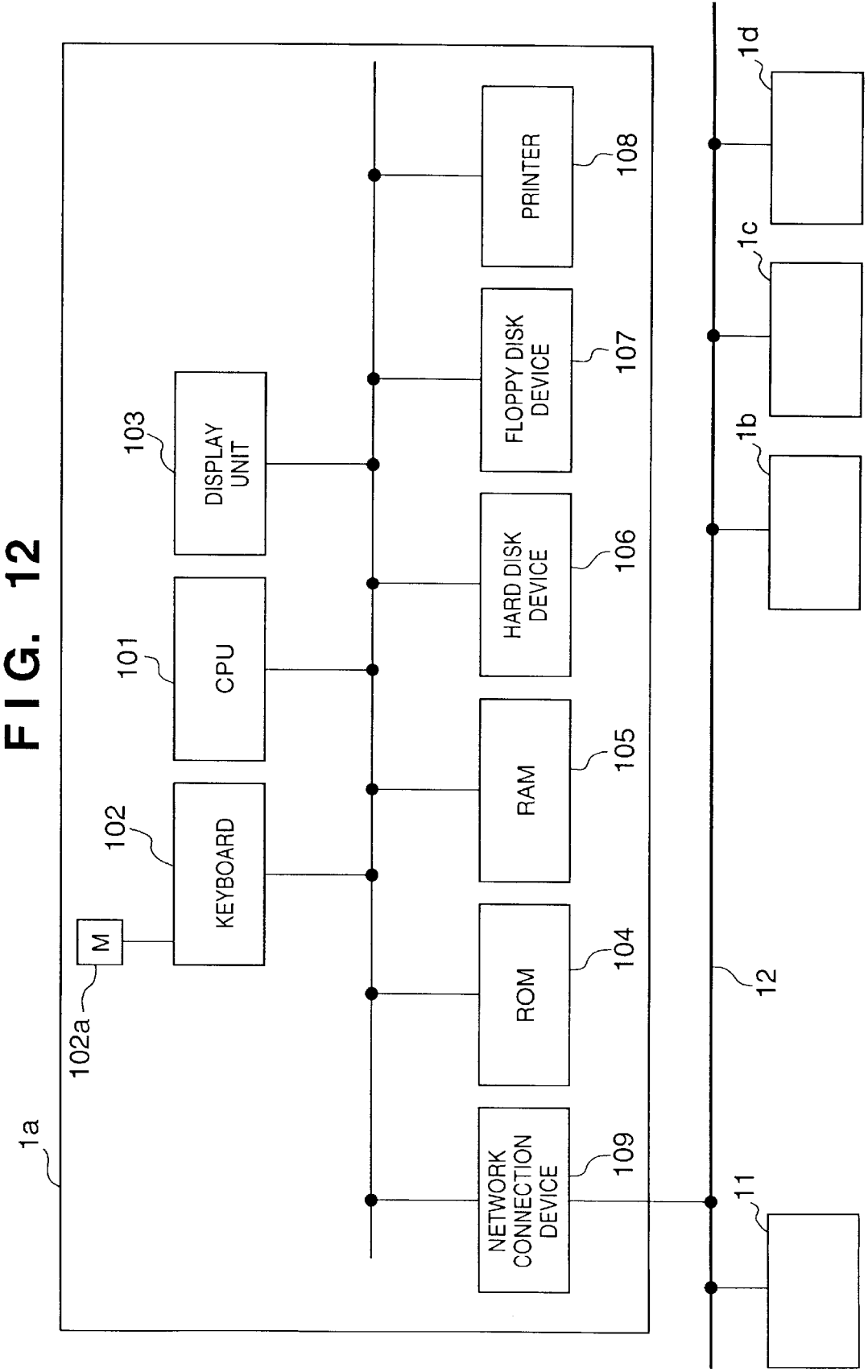

FIG. 13A
FIG. 13B
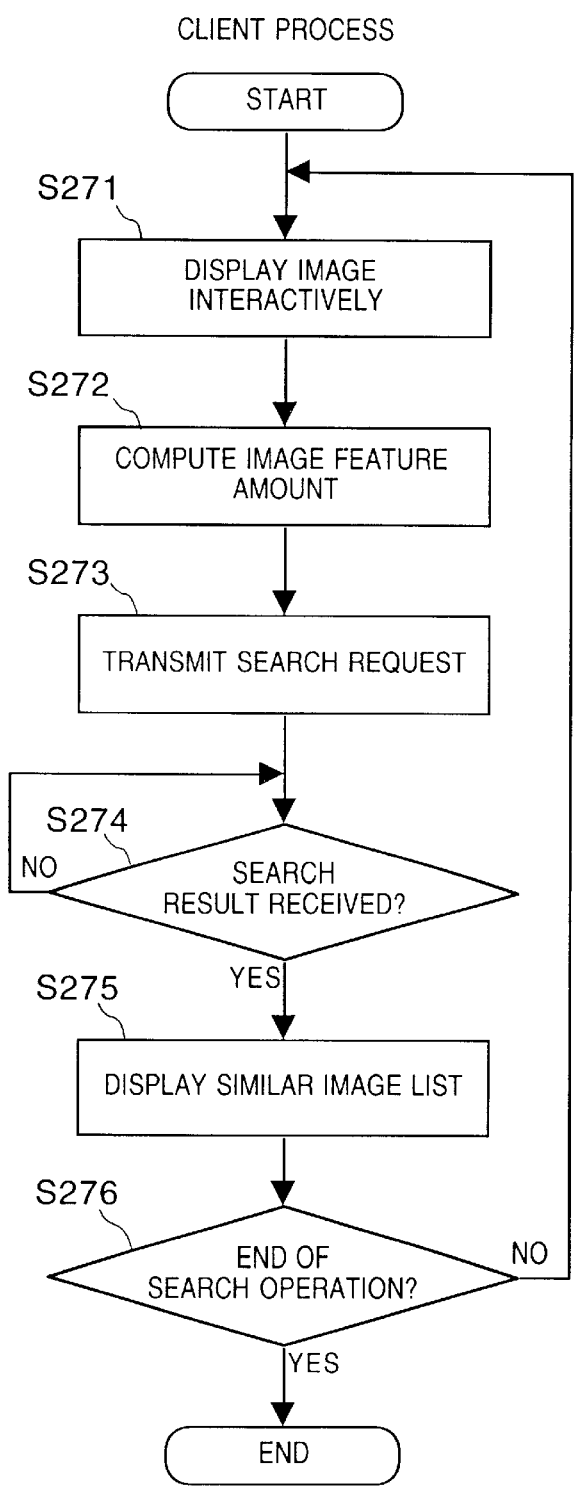
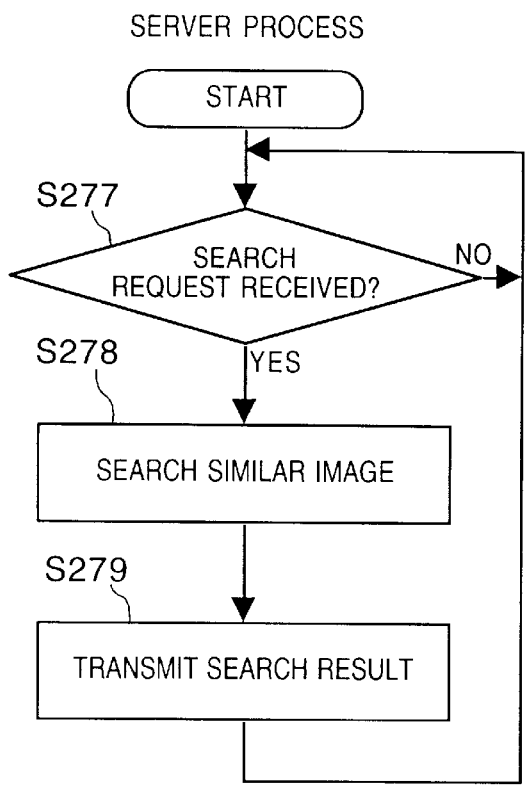

IMAGE SEARCH SYSTEM, IMAGE SEARCH APPARATUS, CONTROL METHOD THEREOF, AND COMPUTER READABLE MEMORY

BACKGROUND OF THE INVENTION

The present invention relates to an image search apparatus and method for searching an image database that stores a plurality of image data for desired image data, and a computer readable memory.

Various image search apparatuses for searching databases which store a large number of image data for desired image data have been proposed. The search methods used in these image search apparatuses are roughly classified into two methods:

a method of storing non-image information such as keywords, photographing dates, and the like in association with image data, and conducting a search based on such information; and a method of conducting a search on the basis of the image feature amounts (luminance/color difference information, image frequency, histogram, and the like) of image data itself.

In the latter method, a method of submitting certain image data, and searching image data using the image feature amounts of that image data as search keys is called similar image search. This method can effectively provide a search interface which is friendly to a user who has no special knowledge about image processing.

However, when a desired image cannot be obtained as a result of a search using a handwritten illustration, which is input by the user as a query key of a similar image search, the user must modify the illustration and must redo a similar image search process. In this case, the user cannot begin to modify the illustration before the display of the previous search results ends completely, and it is hard to make efficient search operation.

When the user searches a plurality of image databases for desired image data using a handwritten illustration, which is input by him or her as a query criteria of a similar image search, he or she must submit the illustration to each of the plurality of image databases to start the search, resulting in cumbersome operation.

On the other hand, even when the user modifies an image based on image data contained on a certain image database and attempts to search other image databases using that image as a query criteria, such search cannot be done or very cumbersome operation is required of the user.

In the conventional image search apparatus, in an environment in which a plurality of users use such apparatuses, they have identical image databases. For this reason, when a certain user edits (e.g., adds/deletes) image data managed by a given image database, the contents of modification done by the user must be reflected in the image databases of other uses. In some case, the consistency of image data managed is lost. When a search engine is modified, all search engines installed in image search apparatuses used by the respective users must be modified. Also, high-performance image search apparatuses must be prepared to improve search efficiency. Since entities of the search engines are installed in the image search apparatuses of the respective users, reverse engineering with respect to each search engine may be done, thus posing a problem in terms of security.

SUMMARY OF THE INVENTION

The present invention has been made in consideration of the aforementioned problems, and has as its object to provide an image search apparatus and its control method, which can efficiently make an image search by quickly reflecting user's will, and a computer readable memory.

It is another object of the present invention to provide an image search system, an image search apparatus, and a control method thereof, which can simultaneously manage image databases used by users in an environment in which a plurality of users use image search apparatuses, and can efficiently make a similar image search while assuring high security, and a computer readable memory.

In order to achieve the above objects, an image search apparatus according to the present invention comprises the following arrangement.

That is, an image search apparatus for searching an image database that stores a plurality of image data for desired image data, comprises:

first control means for controlling execution of input means for inputting an image using an input window, and image feature amount computing means for computing an image feature amount of the image input by the input means;

second control means for controlling execution of storage means for storing the plurality of image data in correspondence with image feature amounts of the image data, image similarity computing means for computing image similarity on the basis of the image feature amount computed by the image feature amount computing means, and the image feature amounts of the image data stored in the storage means, and image display means for displaying a list of image data as search results on the basis of the image similarity computed by the image similarity computing means; and third control means for parallelly processing control processes of the first and second control means, and controlling a communication between the first and second control means.

In order to achieve the above objects, an image search apparatus according to the present invention comprises the following arrangement.

That is, an image search apparatus for searching an image database that stores a plurality of image data for desired image data, comprises:

first control means for controlling execution of input means for inputting an image using an input window;

second control means for controlling execution of image feature amount computing means for computing an image feature amount of the image input by the input means, storage means for storing the plurality of image data in correspondence with image feature amounts of the image data, image similarity computing means for computing image similarity on the basis of the image feature amount computed by the image feature amount computing means, and the image feature amounts of the image data stored in the storage means, and image display means for displaying a list of image data as search results on the basis of the image similarity computed by the image similarity computing means; and third control means for parallelly processing control processes of the first and second control means, and controlling a communication between the first and second control means.

In order to achieve the above objects, an image search apparatus according to the present invention comprises the following arrangement.

That is, an image search apparatus for searching an image database that stores a plurality of image data for desired image data, comprises:

first control means for controlling execution of input means for inputting an image using an input window;

second control means for controlling execution of image feature amount computing means for computing an image feature amount of the image input by the input means;

third control means for controlling execution of storage means for storing the plurality of image data in correspondence with image feature amounts of the image data, image similarity computing means for computing image similarity on the basis of the image feature amount computed by the image feature amount computing means, and the image feature amounts of the image data stored in the storage means, and image display means for displaying a list of image data as search results on the basis of the image similarity computed by the image similarity computing means; and fourth control means for parallelly processing control processes of the first, second, and third control means, and controlling a communication among the first, second, and third control means.

In order to achieve the above objects, a method of controlling an image search apparatus according to the present invention comprises the following arrangement.

That is, a method of controlling an image search apparatus for searching an image database that stores a plurality of image data for desired image data, comprises:

the control step of parallelly processing first and second processes, and controlling a communication between the first and second processes, the first process comprises:
the input step of inputting an image input on an input window; and
the image feature amount computing step of computing an image feature amount of the image input in the input step, and the second process comprises:
the storage step of storing the plurality of image data in a storage medium in correspondence with image feature amounts of the image data;
the image similarity computing step of computing image similarity on the basis of the image feature amount computed in the image feature amount computing step, and the image feature amounts of the image data stored in the storage medium in the storage step; and
the image display step of displaying a list of image data as search results on the basis of the image similarity computed in the image similarity computing step.

In order to achieve the above objects, a method of controlling an image search apparatus according to the present invention comprises the following arrangement.

That is, a method of controlling an image search apparatus for searching an image database that stores a plurality of image data for desired image data, comprises:

the control step of parallelly processing first and second processes, and controlling a communication between the first and second processes, the first process comprises:
the input step of inputting an image input on an input window, and the second process comprises:
the image feature amount computing step of computing an image feature amount of the image input in the input step;
the storage step of storing the plurality of image data in a storage medium in correspondence with image feature amounts of the image data;
the image similarity computing step of computing image similarity on the basis of the image feature amount computed in the image feature amount computing step, and the image feature amounts of the image data stored in the storage medium in the storage step; and
the image display step of displaying a list of image data as search results on the basis of the image similarity computed in the image similarity computing step.

In order to achieve the above objects, a method of controlling an image search apparatus according to the present invention comprises the following arrangement.

That is, a method of controlling an image search apparatus for searching an image database that stores a plurality of image data for desired image data, comprises:

the control step of parallelly processing first, second, and third processes, and controlling a communication among the first, second, and third processes, the first process comprises:
the input step of inputting an image input on an input window, the second process comprises:
the image feature amount computing step of computing an image feature amount of the image input in the input step, and the third process comprises:
the storage step of storing the plurality of image data in a storage medium in correspondence with image feature amounts of the image data;
the image similarity computing step of computing image similarity on the basis of the image feature amount computed in the image feature amount computing step, and the image feature amounts of the image data stored in the storage medium in the storage step; and
the image display step of displaying a list of image data as search results on the basis of the image similarity computed in the image similarity computing step.

In order to achieve the above objects, a computer readable memory according to the present invention comprises the following arrangement.

That is, a computer readable memory that stores a program code of a method of controlling an image search apparatus for searching an image database that stores a plurality of image data for desired image data, comprises:

a program code of the control step of parallelly processing first and second processes, and controlling a communication between the first and second processes, the first process comprises:
a program code of the input step of inputting an image input on an input window; and
a program code of the image feature amount computing step of computing an image feature amount of the image input in the input step, and the second process comprises:
a program code of the storage step of storing the plurality of image data in a storage medium in correspondence with image feature amounts of the image data;

a program code of the image similarity computing step
of computing image similarity on the basis of the
image feature amount computed in the image feature
amount computing step, and the image feature
amounts of the image data stored in the storage
medium in the storage step; and a program code of the image display step of displaying
a list of image data as search results on the basis of
the image similarity computed in the image similarity computing step.

In order to achieve the above objects, a computer readable memory according to the present invention comprises the following arrangement.

That is, a computer readable memory that stores a program code of a method of controlling an image search apparatus for searching an image database that stores a plurality of image data for desired image data, comprises:

a program code of the control step of parallelly processing first and second processes, and controlling a communication between the first and second processes, the first process comprises:
a program code of the input step of inputting an image input on an input window, and the second process comprises:
a program code of the image feature amount computing step of computing an image feature amount of the image input in the input step;

a program code of the storage step of storing the plurality of image data in a storage medium in correspondence with image feature amounts of the image data;

a program code of the image similarity computing step of computing image similarity on the basis of the image feature amount computed in the image feature amount computing step, and the image feature amounts of the image data stored in the storage medium in the storage step; and a program code of the image display step of displaying a list of image data as search results on the basis of the image similarity computed in the image similarity computing step.

In order to achieve the above objects, a computer readable memory according to the present invention comprises the following arrangement.

That is, a computer readable memory that stores a program code of a method of controlling an image search apparatus for searching an image database that stores a plurality of image data for desired image data, comprises:

a program code of the control step of parallelly processing first, second, and third processes, and controlling a communication among the first, second, and third processes, the first process comprises:
a program code of the input step of inputting an image input on an input window, the second process comprises:
a program code of the image feature amount computing step of computing an image feature amount of the image input in the input step, and the third process comprises:
a program code of the storage step of storing the plurality of image data in a storage medium in correspondence with image feature amounts of the image data;

a program code of the image similarity computing step of computing image similarity on the basis of the image feature amount computed in the image feature amount computing step, and the image feature amounts of the image data stored in the storage medium in the storage step; and a program code of the image display step of displaying a list of image data as search results on the basis of the image similarity computed in the image similarity computing step.

In order to achieve the above objects, an image search apparatus according to the present invention comprises the following arrangement.

That is, an image search apparatus for searching an image database that stores a plurality of image data for desired image data, comprises:

control means for parallelly processing at least three processes, i.e., first to third processes, and controlling a communication among the first to third processes, the first process controls execution of:
input means for inputting an image using an input window; and image feature amount computing means for computing an image feature amount of the image input by the input means, the second process controls execution of:
first storage means for storing the plurality of image data in correspondence with image feature amounts of the image data;

first image similarity computing means for computing image similarity on the basis of the image feature amount computed by the image feature amount computing means, and the image feature amounts of the image data stored in the first storage means; and first image display means for displaying a list of image data as search results on the basis of the image similarity computed by the first image similarity computing means, and the third process controls execution of:
second storage means for storing the plurality of image data in correspondence with image feature amounts of the image data;

second image similarity computing means for computing image similarity on the basis of the image feature amount computed by the image feature amount computing means, and the image feature amounts of the image data stored in the second storage means; and second image display means for displaying a list of image data as search results on the basis of the image similarity computed by the second image similarity computing means.

In order to achieve the above objects, an image search apparatus according to the present invention comprises the following arrangement.

That is, an image search apparatus for searching an image database that stores a plurality of image data for desired image data, comprises:

control means for parallelly processing at least two processes, i.e., first and second processes, and controlling a communication between the first and second processes, the first process controls execution of:
input means for inputting an image using an input window;

image feature amount computing means for computing an image feature amount of the image input by the input means;

first storage means for storing the plurality of image data in correspondence with image feature amounts of the image data;

first image similarity computing means for computing image similarity on the basis of the image feature amount computed by the image feature amount computing means, and the image feature amounts of the image data stored in the first storage means; and first image display means for displaying a list of image data as search results on the basis of the image similarity computed by the first image similarity computing means, and the second process controls execution of:

second storage means for storing the plurality of image data in correspondence with image feature amounts of the image data;

second image similarity computing means for computing image similarity on the basis of the image feature amount computed by the image feature amount computing means, and the image feature amounts of the image data stored in the second storage means; and second image display means for displaying a list of image data as search results on the basis of the image similarity computed by the second image similarity computing means.

In order to achieve the above objects, a method of controlling an image search apparatus according to the present invention comprises the following arrangement.

That is, a method of controlling an image search apparatus for searching an image database that stores a plurality of image data for desired image data, comprises:

the control step of parallelly processing at least three processes, i.e., first to third processes, and controlling a communication among the first to third processes, the first process comprises:

the input step of inputting an image input on an input window; and the image feature amount computing step of computing an image feature amount of the image input in the input step, and the second process comprises:

the first storage step of storing the plurality of image data in a first storage medium in correspondence with image feature amounts of the image data;

the first image similarity computing step of computing image similarity on the basis of the image feature amount computed in the image feature amount computing step, and the image feature amounts of the image data stored in the first storage medium in the first storage step; and the first image display step of displaying a list of image data as search results on the basis of the image similarity computed in the first image similarity computing step, and the third process comprises:

the second storage step of storing the plurality of image data in a second storage medium in correspondence with image feature amounts of the image data;

the second image similarity computing step of computing image similarity on the basis of the image feature amount computed in the image feature amount computing step, and the image feature amounts of the image data stored in the second storage medium in the second storage step; and the second image display step of displaying a list of image data as search results on the basis of the image similarity computed in the second image similarity computing step.

In order to achieve the above objects, a method of controlling an image search apparatus according to the present invention comprises the following arrangement.

That is, a method of controlling an image search apparatus for searching an image database that stores a plurality of image data for desired image data, comprises:

the control step of parallelly processing at least two processes, i.e., first and second processes, and controlling a communication between the first and second processes, the first process comprises:

the input step of inputting an image input on an input window;

the image feature amount computing step of computing an image feature amount of the image input in the input step;

the first storage step of storing the plurality of image data in a first storage medium in correspondence with image feature amounts of the image data;

the first image similarity computing step of computing image similarity on the basis of the image feature amount computed in the image feature amount computing step, and the image feature amounts of the image data stored in the first storage medium in the first storage step; and the first image display step of displaying a list of image data as search results on the basis of the image similarity computed in the first image similarity computing step, and the second process comprises:

the second storage step of storing the plurality of image data in a second storage medium in correspondence with image feature amounts of the image data;

the second image similarity computing step of computing image similarity on the basis of the image feature amount computed in the image feature amount computing step, and the image feature amounts of the image data stored in the second storage medium in the second storage step; and the second image display step of displaying a list of image data as search results on the basis of the image similarity computed in the second image similarity computing step.

In order to achieve the above objects, a computer readable memory according to the present invention comprises the following arrangement.

That is, a computer readable memory that stores a program code of a method of controlling an image search apparatus for searching an image database that stores a plurality of image data for desired image data, comprises:

a program code of the control step of parallelly processing at least three processes, i.e., first to third processes, and controlling a communication among the first to third processes, the first process comprises:

a program code of the input step of inputting an image input on an input window; and a program code of the image feature amount computing step of computing an image feature amount of the image input in the input step, and the second process comprises:

a program code of the first storage step of storing the plurality of image data in a first storage medium in correspondence with image feature amounts of the image data;

a program code of the first image similarity computing step of computing image similarity on the basis of the image feature amount computed in the image feature amount computing step, and the image feature amounts of the image data stored in the first storage medium in the first storage step; and a program code of the first image display step of displaying a list of image data as search results on the basis of the image similarity computed in the first image similarity computing step, and the third process comprises:

a program code of the second storage step of storing the plurality of image data in a second storage medium in correspondence with image feature amounts of the image data;

a program code of the second image similarity computing step of computing image similarity on the basis of the image feature amount computed in the image feature amount computing step, and the image feature amounts of the image data stored in the second storage medium in the second storage step; and a program code of the second image display step of displaying a list of image data as search results on the basis of the image similarity computed in the second image similarity computing step.

In order to achieve the above objects, a computer readable memory according to the present invention comprises the following arrangement.

That is, a computer readable memory that stores a program code of a method of controlling an image search apparatus for searching an image database that stores a plurality of image data for desired image data, comprises:

a program code of the control step of parallelly processing at least two processes, i.e., first and second processes, and controlling a communication between the first and second processes, the first process comprises:

a program code of the input step of inputting an image input on an input window;

a program code of the image feature amount computing step of computing an image feature amount of the image input in the input step;

a program code of the first storage step of storing the plurality of image data in a first storage medium in correspondence with image feature amounts of the image data;

a program code of the first image similarity computing step of computing image similarity on the basis of the image feature amount computed in the image feature amount computing step, and the image feature amounts of the image data stored in the first storage medium in the first storage step; and a program code of the first image display step of displaying a list of image data as search results on the basis of the image similarity computed in the first image similarity computing step, and the second process comprises:

a program code of the second storage step of storing the plurality of image data in a second storage medium in correspondence with image feature amounts of the image data;

a program code of the second image similarity computing step of computing image similarity on the basis of the image feature amount computed in the image feature amount computing step, and the image feature amounts of the image data stored in the second storage medium in the second storage step; and a program code of the second image display step of displaying a list of image data as search results on the basis of the image similarity computed in the second image similarity computing step.

In order to achieve the above objects, an image search system according to the present invention comprises the following arrangement.

That is, in an image search system for searching an image database that stores a plurality of image data for desired image data between a client computer and server computer, which are connected to each other via a network, the client computer comprises:

input means for inputting an image using an input window;

image feature amount computing means for computing an image feature amount of the image input by the input means;

first transmission means for transmitting the image feature amount computed by the image feature amount computing means to the server computer; and first reception means for receiving search results from the server computer, and the server computer comprises:

storage means for storing the plurality of image data in correspondence with image feature amounts of the image data;

second reception means for receiving the image feature amount computed by the image feature amount computing means from the client computer;

image similarity computing means for computing image similarity on the basis of the image feature amount received by the second reception means, and the image feature amounts of the image data stored in the storage means;

search means for searching image data on the basis of the image similarity computed by the image similarity computing means; and second transmission means for transmitting search results of the search means to the client computer.

In order to achieve the above objects, a method of controlling an image search system according to the present invention comprises the following arrangement.

That is, a method of controlling an image search system for searching an image database that stores a plurality of image data for desired image data between a client computer and server computer, which are connected to each other via a network, comprises:

the management step of managing the plurality of image data in correspondence with image feature amounts of the image data in the server computer;

the input step of inputting an image input on an input window;

the image feature amount computing step of computing an image feature amount of the image input in the input step;

the image similarity computing step of computing image similarity on the basis of the image feature amount computed in the image feature amount computing step, and the image feature amounts of the image data managed in the server computer in the management step; and the transmission step of transmitting search results to the client computer on the basis of the image similarity computed in the image similarity computing step.

In order to achieve the above objects, an image search apparatus according to the present invention comprises the following arrangement.

That is, an image search apparatus, which is connected to an external apparatus via a network, and searches an image database that stores a plurality of image data for desired image data, comprises:

management means for managing the plurality of image data in the external apparatus in correspondence with image feature amounts of the image data;

input means for inputting an image using an input window;

image feature amount computing means for computing an image feature amount of the image input by the input means;

transmission means for transmitting the image feature amount computed by the image feature amount computing means to the external apparatus; and reception means for receiving image data that serve as search results from the external apparatus.

In order to achieve the above objects, an image search apparatus according to the present invention comprises the following arrangement.

That is, an image search apparatus, which is connected to an external apparatus via a network, and searches an image database that stores a plurality of image data for desired image data, comprises:

storage means for storing the plurality of image data in correspondence with image feature amounts of the image data;

reception means for receiving from the external apparatus an image feature amount of an image, which is drawn by a user and is input as a query criteria;

image similarity computing means for computing image similarity on the basis of the image feature amount received by the reception means, and the image feature amounts of the image data stored in the first storage means;

search means for searching image data on the basis of the image similarity computed by the image similarity computing means; and transmission means for transmitting search results of the search means to the external apparatus.

In order to achieve the above objects, an image search method according to the present invention comprises the following arrangement.

That is, a method of controlling an image search apparatus, which is connected to an external apparatus via a network, and searches an image database that stores a plurality of image data for desired image data, comprises:

the management step of managing the plurality of image data in the external apparatus in correspondence with image feature amounts of the image data;

the input step of inputting an image input on an input window;

the image feature amount computing step of computing an image feature amount of the image input in the input step;

the transmission step of transmitting the image feature amount computed in the image feature amount computing step to the external apparatus; and the reception step of receiving image data that serve as search results from the external apparatus.

In order to achieve the above objects, an image search method according to the present invention comprises the following arrangement.

That is, a method of controlling an image search apparatus, which is connected to an external apparatus via a network, and searches an image database that stores a plurality of image data for desired image data, comprises:

the storage step of storing the plurality of image data in a storage medium in correspondence with image feature amounts of the image data;

the reception step of receiving from the external apparatus an image feature amount of an image, which is drawn by a user and is input as a query criteria;

the image similarity computing step of computing image similarity on the basis of the image feature amount received in the reception step, and the image feature amounts of the image data stored in the storage medium in the storage step;

the search step of searching image data on the basis of the image similarity computed in the image similarity computing step; and the transmission step of transmitting search results in the search step to the external apparatus.

In order to achieve the above objects, a computer readable memory according to the present invention comprises the following arrangement.

That is, a computer readable memory which stores a program code of controlling an image search system, which searches an image database that stores a plurality of image data for desired image data between client and server computers connected to each other via a network, comprises:

a program code of the management step of managing the plurality of image data in the server computer in correspondence with image feature amounts of the image data;

a program code of the input step of inputting an image input on an input window;

a program code of the image feature amount computing step of computing an image feature amount of the image input in the input step;

a program code of the image similarity computing step of computing image similarity on the basis of the image feature amount computed in the image feature amount computing step, and the image feature amounts managed in the management step in the server computer; and a program code of the transmission step of transmitting search results to the client computer on the basis of the image similarity computed in the image similarity computing step.

In order to achieve the above objects, a computer readable memory according to the present invention comprises the following arrangement.

That is, a computer readable memory which stores a program code of controlling an image search apparatus, which is connected to an external apparatus via a network, and searches an image database that stores a plurality of image data for desired image data, comprises:

a program code of the management step of managing the plurality of image data in the external apparatus in correspondence with image feature amounts of the image data;

a program code of the input step of inputting an image input on an input window;

a program code of the image feature amount computing step of computing an image feature amount of the image input in the input step;

a program code of the transmission step of transmitting the image feature amount computed in the image feature amount computing step to the external apparatus; and a program code of the reception step of receiving search results from the external apparatus.

In order to achieve the above objects, a computer readable memory according to the present invention comprises the following arrangement.

That is, a computer readable memory which stores a program code of controlling an image search apparatus, which is connected to an external apparatus via a network, and searches an image database that stores a plurality of image data for desired image data, comprises:

- a program code of the storage step of storing the plurality of image data in a storage medium in correspondence with image feature amounts of the image data;
- a program code of the reception step of receiving from the external apparatus an image feature amount of an image, which is drawn by a user and is input as a query criteria;
- a program code of the image similarity computing step of computing image similarity on the basis of the image feature amount received in the reception step, and the image feature amounts of the image data stored in the storage medium in the storage step;
- a program code of the search step of searching image data on the basis of the image similarity computed in the image similarity computing step; and
- a program code of the transmission step of transmitting search results in the search step to the external apparatus.

In order to achieve the above objects, an image search apparatus according to the present invention comprises the following arrangement.

That is, an image search apparatus for searching an image database that stores a plurality of image data for desired image data, comprises:

- first control means for controlling execution of input means for inputting an image using an input window, image feature amount computing means for computing an image feature amount of the image input by the input means, storage means for storing the plurality of image data in correspondence with image feature amounts of the image data, and image similarity computing means for computing image similarity on the basis of the image feature amount computed by the image feature amount computing means, and the image feature amounts of the image data stored in the storage means;
- second control means for controlling execution of image display means for displaying a list of image data as search results on the basis of the image similarity computed by the image similarity computing means; and
- third control means for parallelly processing control processes of the first and second control means, and controlling a communication between the first and second control means.

In order to achieve the above objects, an image search apparatus according to the present invention comprises the following arrangement.

That is, an image search apparatus for searching an image database that stores a plurality of image data for desired image data, comprises:

- first control means for controlling execution of input means for inputting an image using an input window, and image feature amount computing means for computing an image feature amount of the image input by the input means;
- second control means for controlling execution of storage means for storing the plurality of image data in correspondence with image feature amounts of the image data, and image similarity computing means for computing image similarity on the basis of the image feature amount computed by the image feature amount computing means, and the image feature amounts of the image data stored in the storage means;
- third control means for controlling execution of image display means for displaying a list of image data as search results on the basis of the image similarity computed by the image similarity computing means; and
- fourth control means for parallelly processing control processes of the first to third control means, and controlling a communication among the first to third control means.

In order to achieve the above objects, an image search apparatus according to the present invention comprises the following arrangement.

That is, an image search apparatus for searching an image database that stores a plurality of image data for desired image data, comprises:

- first control means for controlling execution of input means for inputting an image using an input window;
- second control means for controlling execution of image feature amount computing means for computing an image feature amount of the image input by the input means, storage means for storing the plurality of image data in correspondence with image feature amounts of the image data, and image similarity computing means for computing image similarity on the basis of the image feature amount computed by the image feature amount computing means, and the image feature amounts of the image data stored in the storage means;
- third control means for controlling execution of image display means for displaying a list of image data as search results on the basis of the image similarity computed by the image similarity computing means; and
- fourth control means for parallelly processing control processes of the first to third control means, and controlling a communication among the first to third control means.

In order to achieve the above objects, an image search apparatus according to the present invention comprises the following arrangement.

That is, an image search apparatus for searching an image database that stores a plurality of image data for desired image data, comprises:

- first control means for controlling execution of input means for inputting an image using an input window;
- second control means for controlling execution of image feature amount computing means for computing an image feature amount of the image input by the input means;
- third control means for controlling execution of storage means for storing the plurality of image data in correspondence with image feature amounts of the image data, and image similarity computing means for computing image similarity on the basis of the image feature amount computed by the image feature amount computing means, and the image feature amounts of the image data stored in the storage means;
- fourth control means for controlling execution of image display means for displaying a list of image data as search results on the basis of the image similarity computed by the image similarity computing means; and fifth control means for parallelly processing control processes of the first to fourth control means, and controlling a communication among the first to fourth control means.

In order to achieve the above objects, an image search apparatus according to the present invention comprises the following arrangement.

That is, an image search apparatus for searching an image database that stores a plurality of image data for desired image data, comprises:

first control means for controlling execution of input means for inputting an image using an input window;

second control means for controlling execution of image feature amount computing means for computing an image feature amount of the image input by the input means;

third control means for controlling execution of storage means for storing the plurality of image data in correspondence with image feature amounts of the image data;

fourth control means for controlling execution of image similarity computing means for computing image similarity on the basis of the image feature amount computed by the image feature amount computing means, and the image feature amounts of the image data stored in the storage means;

fifth control means for controlling execution of image display means for displaying a list of image data as search results on the basis of the image similarity computed by the image similarity computing means; and sixth control means for parallelly processing control processes of an arbitrary combination of the first to fifth control means, and controlling a communication among the first to fifth control means.

In order to achieve the above objects, a method of controlling an image search apparatus according to the present invention comprises the following arrangement.

That is, a method of controlling an image search apparatus for searching an image database that stores a plurality of image data for desired image data, comprises:

the control step of parallelly processing first and second processes, and controlling a communication between the first and second processes, the first process comprises:
the input step of inputting an image using an input window;
the image feature amount computing step of computing an image feature amount of the image input in the input step;
the storage step of storing the plurality of image data in a storage medium in correspondence with image feature amounts of the image data; and
the image similarity computing step of computing image similarity on the basis of the image feature amount computed in the image feature amount computing step, and the image feature amounts of the image data stored in the storage medium in the storage step, and the second process comprises:
the image display step of displaying a list of image data as search results on the basis of the image similarity computed in the image similarity computing step.

In order to achieve the above objects, a method of controlling an image search apparatus according to the present invention comprises the following arrangement.

That is, a method of controlling an image search apparatus for searching an image database that stores a plurality of image data for desired image data, comprises:

the control step of parallelly processing first to third processes, and controlling a communication among the first to third processes, the first process comprises:
the input step of inputting an image using an input window; and
the image feature amount computing step of computing an image feature amount of the image input in the input step, the second process comprises:
the storage step of storing the plurality of image data in a storage medium in correspondence with image feature amounts of the image data; and
the image similarity computing step of computing image similarity on the basis of the image feature amount computed in the image feature amount computing step, and the image feature amounts of the image data stored in the storage medium in the storage step, and the third process comprises:
the image display step of displaying a list of image data as search results on the basis of the image similarity computed in the image similarity computing step.

In order to achieve the above objects, a method of controlling an image search apparatus according to the present invention comprises the following arrangement.

That is, a method of controlling an image search apparatus for searching an image database that stores a plurality of image data for desired image data, comprises:

the control step of parallelly processing first to third processes, and controlling a communication among the first to third processes, the first process comprises:
the input step of inputting an image using an input window, the second process comprises:
the image feature amount computing step of computing an image feature amount of the image input in the input step;
the storage step of storing the plurality of image data in a storage medium in correspondence with image feature amounts of the image data; and
the image similarity computing step of computing image similarity on the basis of the image feature amount computed in the image feature amount computing step, and the image feature amounts of the image data stored in the storage medium in the storage step, and the third process comprises:
the image display step of displaying a list of image data as search results on the basis of the image similarity computed in the image similarity computing step.

In order to achieve the above objects, a method of controlling an image search apparatus according to the present invention comprises the following arrangement.

That is, a method of controlling an image search apparatus for searching an image database that stores a plurality of image data for desired image data, comprises:

the control step of parallelly processing first to fourth processes, and controlling a communication among the first to fourth processes, the first process comprises:
  the input step of inputting an image using an input window,
the second process comprises:
  the image feature amount computing step of computing an image feature amount of the image input in the input step,
the third process comprises:
  the storage step of storing the plurality of image data in a storage medium in correspondence with image feature amounts of the image data; and
  the image similarity computing step of computing image similarity on the basis of the image feature amount computed in the image feature amount computing step, and the image feature amounts of the image data stored in the storage medium in the storage step, and
the fourth process comprises:
  the image display step of displaying a list of image data as search results on the basis of the image similarity computed in the image similarity computing step.

In order to achieve the above objects, a method of controlling an image search apparatus according to the present invention comprises the following arrangement.

That is, a method of controlling an image search apparatus for searching an image database that stores a plurality of image data for desired image data, comprises:
  the control step of parallelly processing an arbitrary combination of first to fifth processes, and controlling a communication among the first to fifth processes,
  the first process comprises:
    the input step of inputting an image using an input window,
  the second process comprises:
    the image feature amount computing step of computing an image feature amount of the image input in the input step,
  the third process comprises:
    the storage step of storing the plurality of image data in a storage medium in correspondence with image feature amounts of the image data,
  the fourth process comprises:
    the image similarity computing step of computing image similarity on the basis of the image feature amount computed in the image feature amount computing step, and the image feature amounts of the image data stored in the storage medium in the storage step, and
  the fifth process comprises:
    the image display step of displaying a list of image data as search results on the basis of the image similarity computed in the image similarity computing step.

In order to achieve the above objects, a computer readable memory according to the present invention comprises the following arrangement.

That is, a computer readable memory that stores a program code of controlling an image search apparatus for searching an image database that stores a plurality of image data for desired image data, comprises:
  a program code of the control step of parallelly processing first and second processes, and controlling a communication between the first and second processes,
  the first process comprises:
    a program code of the input step of inputting an image using an input window;
    a program code of the image feature amount computing step of computing an image feature amount of the image input in the input step;
    a program code of the storage step of storing the plurality of image data in a storage medium in correspondence with image feature amounts of the image data; and
    a program code of the image similarity computing step of computing image similarity on the basis of the image feature amount computed in the image feature amount computing step, and the image feature amounts of the image data stored in the storage medium in the storage step, and
  the second process comprises:
    a program code of the image display step of displaying a list of image data as search results on the basis of the image similarity computed in the image similarity computing step.

In order to achieve the above objects, a computer readable memory according to the present invention comprises the following arrangement.

That is, a computer readable memory that stores a program code of controlling an image search apparatus for searching an image database that stores a plurality of image data for desired image data, comprises:
  a program code of the control step of parallelly processing first to third processes, and controlling a communication among the first to third processes,
  the first process comprises:
    a program code of the input step of inputting an image using an input window; and
    a program code of the image feature amount computing step of computing an image feature amount of the image input in the input step,
  the second process comprises:
    a program code of the storage step of storing the plurality of image data in a storage medium in correspondence with image feature amounts of the image data; and
    a program code of the image similarity computing step of computing image similarity on the basis of the image feature amount computed in the image feature amount computing step, and the image feature amounts of the image data stored in the storage medium in the storage step, and
  the third process comprises:
    a program code of the image display step of displaying a list of image data as search results on the basis of the image similarity computed in the image similarity computing step.

In order to achieve the above objects, a computer readable memory according to the present invention comprises the following arrangement.

That is, a computer readable memory that stores a program code of controlling an image search apparatus for searching an image database that stores a plurality of image data for desired image data, comprises:
  a program code of the control step of parallelly processing first to third processes, and controlling a communication among the first to third processes,
  the first process comprises:
    a program code of the input step of inputting an image using an input window,
  the second process comprises:
    a program code of the image feature amount computing step of computing an image feature amount of the image input in the input step;

a program code of the storage step of storing the plurality of image data in a storage medium in correspondence with image feature amounts of the image data; and a program code of the image similarity computing step of computing image similarity on the basis of the image feature amount computed in the image feature amount computing step, and the image feature amounts of the image data stored in the storage medium in the storage step, and the third process comprises:

a program code of the image display step of displaying a list of image data as search results on the basis of the image similarity computed in the image similarity computing step.

In order to achieve the above objects, a computer readable memory according to the present invention comprises the following arrangement.

That is, a computer readable memory that stores a program code of controlling an image search apparatus for searching an image database that stores a plurality of image data for desired image data, comprises:

a program code of the control step of parallelly processing first to fourth processes, and controlling a communication among the first to fourth processes, the first process comprises:

a program code of the input step of inputting an image using an input window, the second process comprises:

a program code of the image feature amount computing step of computing an image feature amount of the image input in the input step, the third process comprises:

a program code of the storage step of storing the plurality of image data in a storage medium in correspondence with image feature amounts of the image data; and a program code of the image similarity computing step of computing image similarity on the basis of the image feature amount computed in the image feature amount computing step, and the image feature amounts of the image data stored in the storage medium in the storage step, and the fourth process comprises:

a program code of the image display step of displaying a list of image data as search results on the basis of the image similarity computed in the image similarity computing step.

In order to achieve the above objects, a computer readable memory according to the present invention comprises the following arrangement.

That is, a computer readable memory that stores a program code of controlling an image search apparatus for searching an image database that stores a plurality of image data for desired image data, comprises:

a program code of the control step of parallelly processing an arbitrary combination of first to fifth processes, and controlling a communication among the first to fifth processes, the first process comprises:

a program code of the input step of inputting an image using an input window, the second process comprises:

a program code of the image feature amount computing step of computing an image feature amount of the image input in the input step, the third process comprises:

a program code of the storage step of storing the plurality of image data in a storage medium in correspondence with image feature amounts of the image data, the fourth process comprises:

a program code of the image similarity computing step of computing image similarity on the basis of the image feature amount computed in the image feature amount computing step, and the image feature amounts of the image data stored in the storage medium in the storage step, and the fifth process comprises:

a program code of the image display step of displaying a list of image data as search results on the basis of the image similarity computed in the image similarity computing step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 shows a control window displayed on a display unit upon executing a search process of the first embodiment;

FIG. 4 is a flow chart showing the details of the process executed in step S171 in the first embodiment;

FIG. 5 is a view for explaining image segmentation for extracting an image feature amount in the first embodiment;

FIG. 12 is a block diagram showing the arrangement of an image search system according to the third embodiment of the present invention;

FIG. 13A is a flow chart showing an outline of the processes executed by an image search apparatus of the third embodiment; and FIG. 13B is a flow chart showing an outline of the processes executed by the image search apparatus of the third embodiment.

DESCRIPTION OF THE PREFERRED EMBODIMENTS

The preferred embodiments of the present invention will be described in detail hereinafter with reference to the accompanying drawings.

First Embodiment

Figure 1:
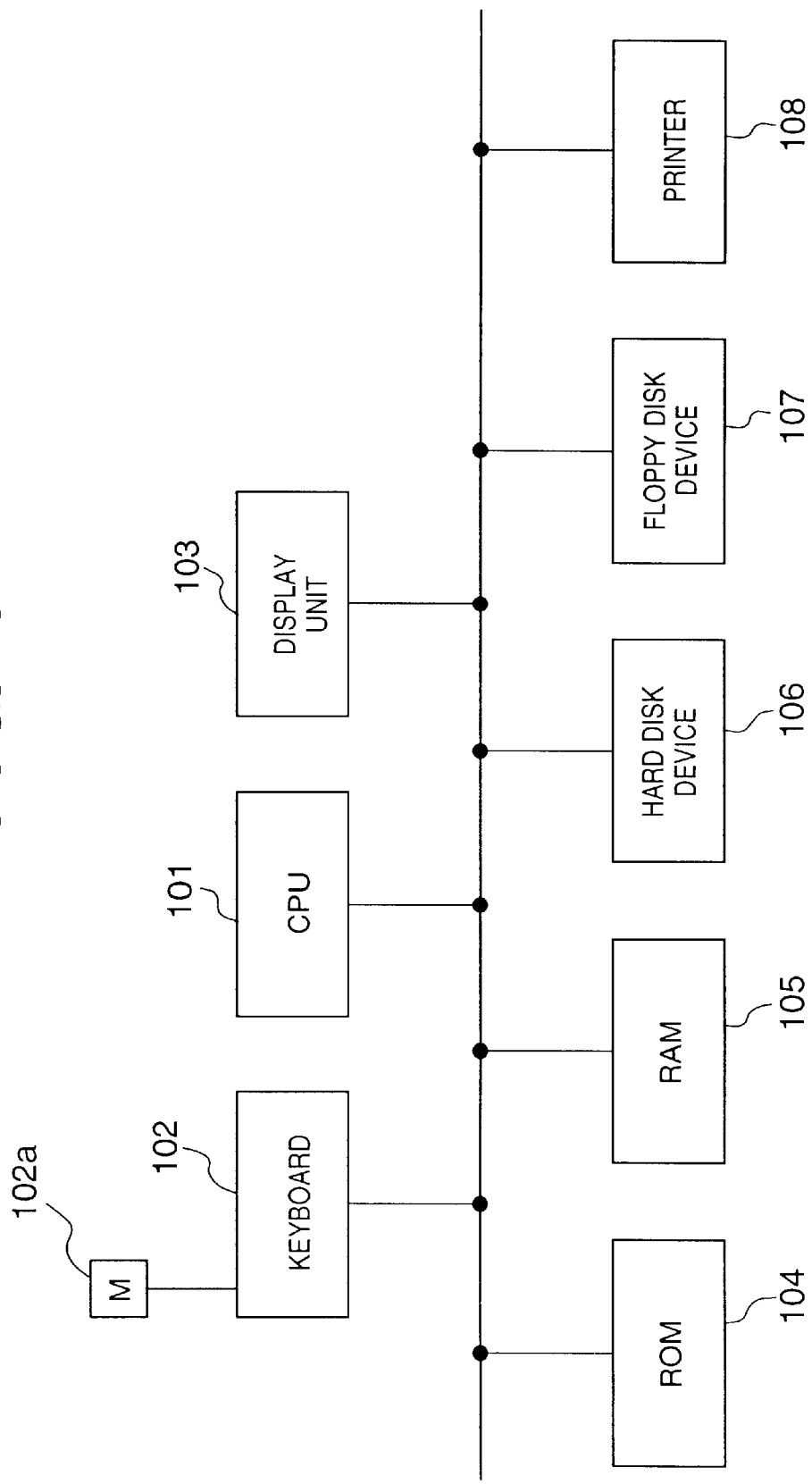
FIG. 1 is a block diagram showing the arrangement of an image search apparatus according to the first embodiment of the present invention.

FIG. 1 is a block diagram showing the arrangement of an image search apparatus according to the first embodiment.

Referring to FIG. 1, reference numeral 101 denotes a CPU for controlling the entire system. Reference numeral 102 denotes a keyboard; and 102a, a pointing device (mouse). The keyboard 102 is used together with the mouse for inputting data into the system and drawing an illustration which is used as a query criteria for a similar image search. Reference numeral 103 denotes a display unit which comprises a CRT, liquid crystal display, or the like, and displays a user interface used for drawing an image serving as a query criteria, and image data as a search result. Reference numeral 104 denotes a ROM; and 105, a RAM. These ROM and RAM construct a memory device of the system, and store programs executed by the system and data used by the system. Reference numeral 106 denotes a hard disk device; and 107, a floppy disk device. The hard disk device and floppy disk device construct an external storage device used as a file system of the system. The hard disk device 106 stores a plurality of image data to be searched. Reference numeral 108 denotes a printer for recording an image or the like displayed on the display unit 103 on a recording medium.

The control window displayed on the display unit 103 upon executing the search process of the first embodiment will be explained below with reference to FIG. 2.

FIG. 2 shows the control window displayed on the display unit upon executing the search process in the first embodiment.

Reference numeral 21 denotes a user drawing area; 22, a cursor; 23, color selection scroll bars; 24, a clear button; 25, a search execution button; 27, a next candidate display button; and 28, a processing end button. Also, reference numerals 26a to 26h denote areas for displaying icon images corresponding to image data as search results.

The user can draw an illustration, which is similar to the image wanted and used as a query criteria, on the user drawing area 21 using the drawing tools implemented by software. The software process upon drawing an illustration will be briefly described below.

The color selection scroll bars 23 are used for selecting a pen color used in drawing, and designate R, G, and B values in turn from the uppermost one. Upon pressing the clear button 24, the entire user drawing area 21 is painted in white. The user moves the cursor 22 using the pointing device 102a and can draw a free curve on the user drawing area 21. Upon pressing the processing end button 28, the control window is closed, and the processing ends.

An outline of the processes executed by the image search apparatus of the first embodiment will be explained below with reference to FIGS. 3A and 3B.

Figure 3A:
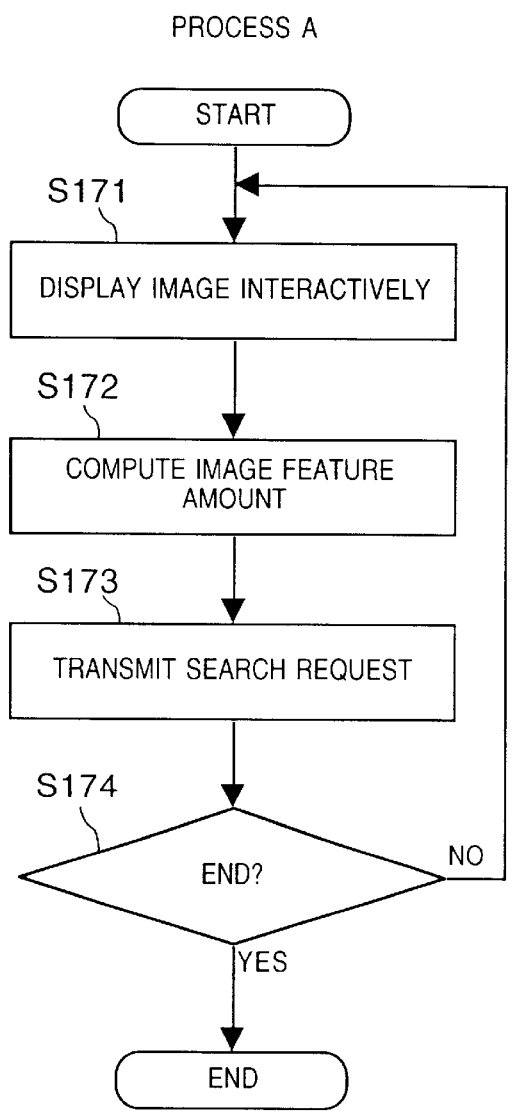
FIG. 3A is a flow chart showing an outline of the processes executed by the image search apparatus of the first embodiment.
Figure 3B:
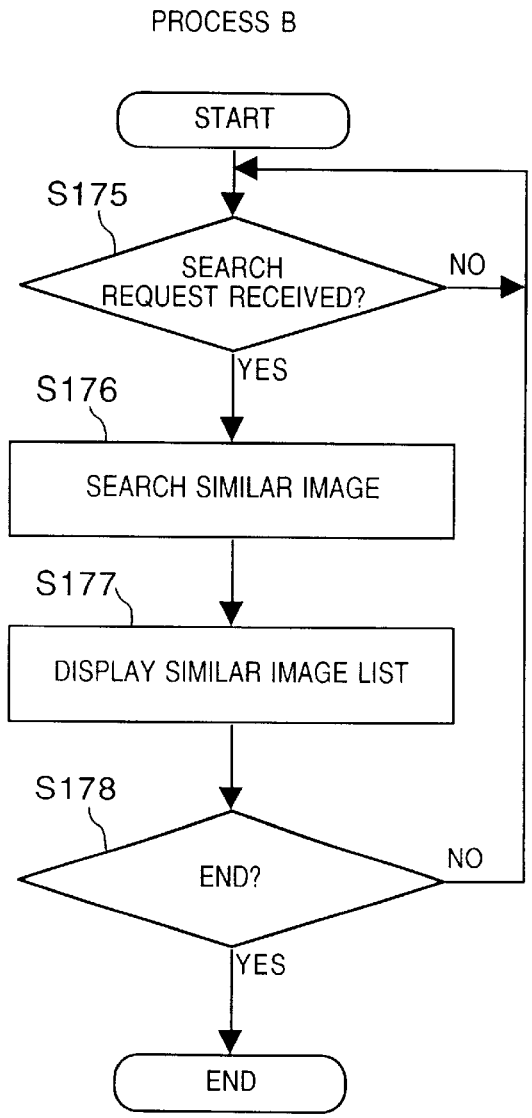
FIG. 3B is a flow chart showing an outline of the processes executed by the image search apparatus of the first embodiment.

FIGS. 3A and 3B are flow charts showing an outline of the processes executed by the image search apparatus of the first embodiment.

Processes A and B are parallelly executed while communicating with each other. Such processes are implemented by a multi-process OS represented by UNIX or the like. These processes may be implemented in fine control units, or may be implemented by hardware, threads or the like.

The processes executed in process A will be explained below with reference to FIG. 3A.

In step S171, the user draws an illustration, which is similar to the image data wanted and stored on the hard disk device 106, and is used as a query criteria, on the display unit 103. In step S172, the image feature amount of the drawn illustration is computed. In step S173, the computed image feature amount is passed to process B via an inter-process communication. It is checked in step S174 if search operation is to end. If search operation is to continue (NO in step S174), the flow returns to step S171. On the other hand, if search operation is to end (YES in step S174), the processing ends.

The processes executed in process B will be explained below with reference to FIG. 3B.

It is checked in step S175 if an inter-process communication (image feature amount) from process A is received. If the image feature amount is not received (NO in step S175), the flow returns to step S175. That is, a loop for monitoring the inter-process communication is formed. On the other hand, if the image feature amount is received (YES in step S175), the flow advances to step S176.

In step S176, a similar image search is made based on the received image feature amount. In step S177, similar images found by search are displayed on the display unit 103. It is checked in step S178 if search operation is to end. If search operation is not to end (NO in step S178), the flow returns to step S175. On the other hand, if search operation is to end (YES in step S178), the processing ends.

With the above-mentioned processes, illustration drawing by the user and the search/display process can be parallelly executed. In other words, even while the search/display process is in progress, the processing speed of the illustration drawing can be prevented from dropping extremely low, and the user can continue to draw the illustration without experiencing any stress.

The details of the processes executed in the individual steps will be described below.

{Description of Step S171}

In step S171, the user draws an illustration, which is used as a query criteria, on the user drawing area 21, and the flow advances to the next step S172 at an appropriate timing. The process at that time will be explained below with reference to FIG. 4. At that timing, the system monitors the movement of the mouse 102a, and every time a movement is monitored, the image feature amount of the image drawn so far is computed.

FIG. 4 is a flow chart showing the details of the process executed in step S171 in the first embodiment.

Note that x0 and y0 are variables for storing the previous position of the cursor 22, and x1 and y1 are variables that store the current position of the cursor 22.

It is checked in step S31 if the user has moved the mouse 102a. If the user has not moved the mouse yet (NO in step S31), the flow returns to step S31. That is, the process in this step forms a loop for monitoring the movement of the mouse 102a. On the other hand, if the user has moved the mouse (YES in step S31), the flow advances to step S32.

It is checked in step S32 if the mouse button of the mouse 102a is being held down. If the mouse button is not held down (NO in step S32), the flow advances to step S34 to substitute the current position (x1, y1) of the cursor 22 in (x0, y0), and the flow returns to step S31. In this manner, the cursor 22 alone can be moved without drawing any stroke.

On the other hand, if the mouse button is being held down (YES in step S32), i.e., if the user is dragging the mouse, the flow advances to step S33. In step S33, a line is drawn between the previous position (x0, y0) and the current position (x1, y1) of the cursor 22 in a color determined by the color selection scroll bars 23.

In step S35, the current position (x1, y1) of the cursor 22 is substituted in (x0, y0) to end step S171, and the flow advances to step S172.

This process makes the user feel as if a search were automatically executed every time he or she adds a stroke to the illustration.

{Description of Step S172}

In step S172, the image feature amount of the illustration drawn in step S171 is computed.

As shown in FIG. 5, the size of the user drawing area 21 in this embodiment is defined by W pixels (horizontal)×H pixels (vertical). This area is segmented into a total of six sub-areas, i.e., 3 (horizontal)×2 (vertical) sub-areas (0, 0), (1, 0), . . . , (2, 1) in turn from the upper left sub-area. The R, G, and B average values of these sub-areas are computed, and a total of 18 numerical values are used as the image feature amount of the drawn illustration.

The computation process of the image feature amount will be described below with reference to FIG. 6.

Figure 6:
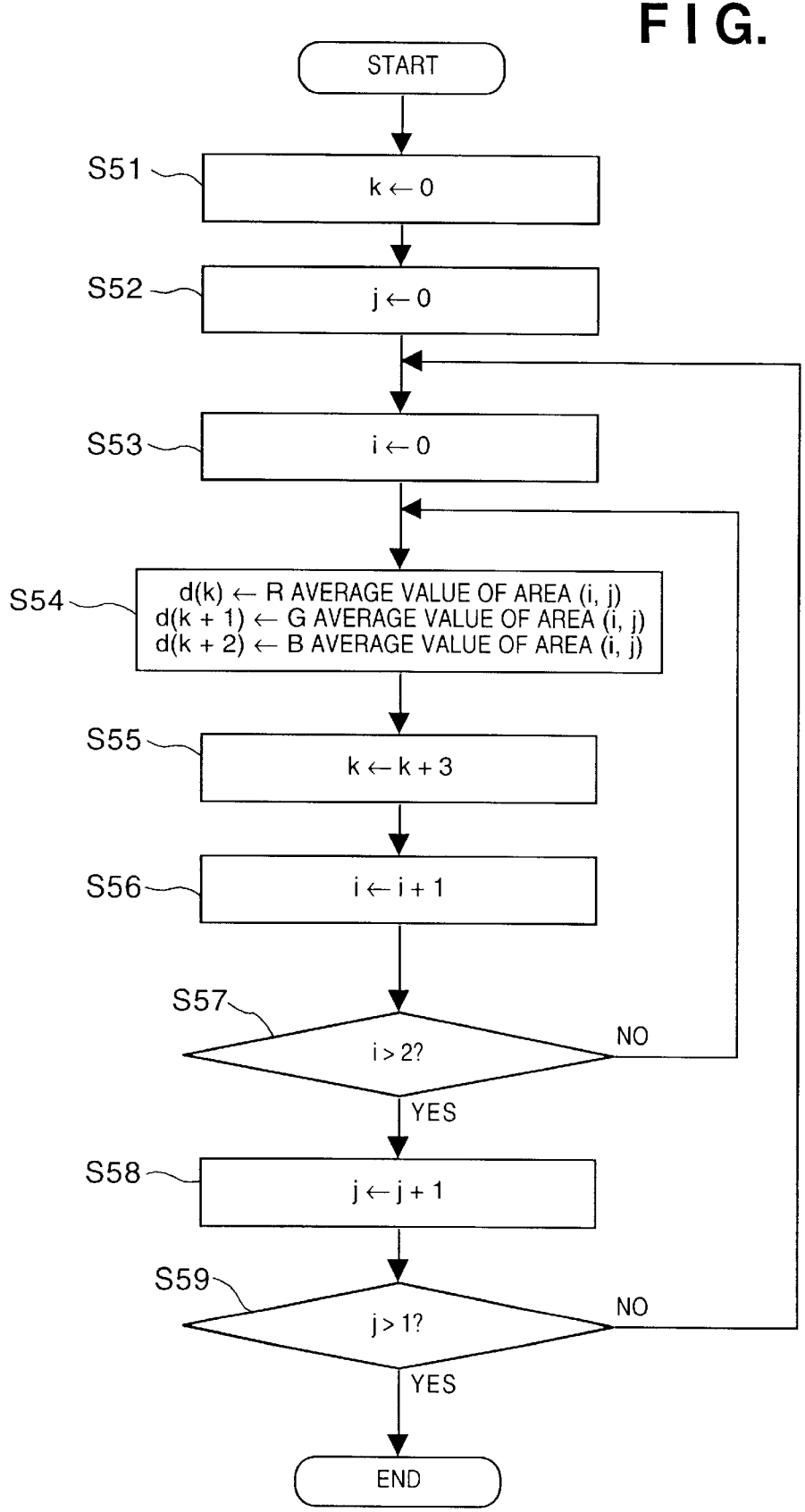
FIG. 6 is a flow chart showing the computation process of the image feature amount in the first embodiment.

FIG. 6 is a flow chart showing the computation process of the image feature amount in the first embodiment.

In step S51, a variable k is initialized to zero. In step S52, a variable j is initialized to zero. In step S53, a variable i is initialized to zero. In step S54, the R average value of a sub-area (i, j) is substituted in the k-th element d(k) of a matrix d. Also, the G and B average values are respectively substituted in d(k+1) and d(k+2). Note that the method of computing the R, G, and B average values will be described in detail later with the aid of the flow chart in FIG. 7.

In step S55, k is incremented by "3". In step S56, i is incremented by "1". In step S57, i is compared with "2". If i>2 (YES in step S57), the flow advances to step S58. On the other hand, if i≦2 (NO in step S57), the flow returns to step S54.

In step S58, the variable j is incremented by "1". In step S59, the variable j is compared with "1". If j>1 (YES in step S59), the process ends. On the other hand, if j≦1 (NO in step S59), the flow returns to step S53.

Upon completion of the process, the computed values of the image feature amount of the drawn illustration are stored in the matrix d( ) having 18 elements. Note that the drawn illustration (image) is segmented into six rectangular areas having equal areas to compute image feature amount values in this embodiment. However, the shape of the segmented area is not limited to a rectangle but may be other complicated shapes, and the number of segmented areas may be increased/decreased. When the number of segmented areas is increased/decreased, the number of elements of the image feature amount is not 18 but increases/decreases accordingly.

The method of computing the R, G, and B average values in step S54 in FIG. 6 will be described in detail below using FIG. 7.

Figure 7:
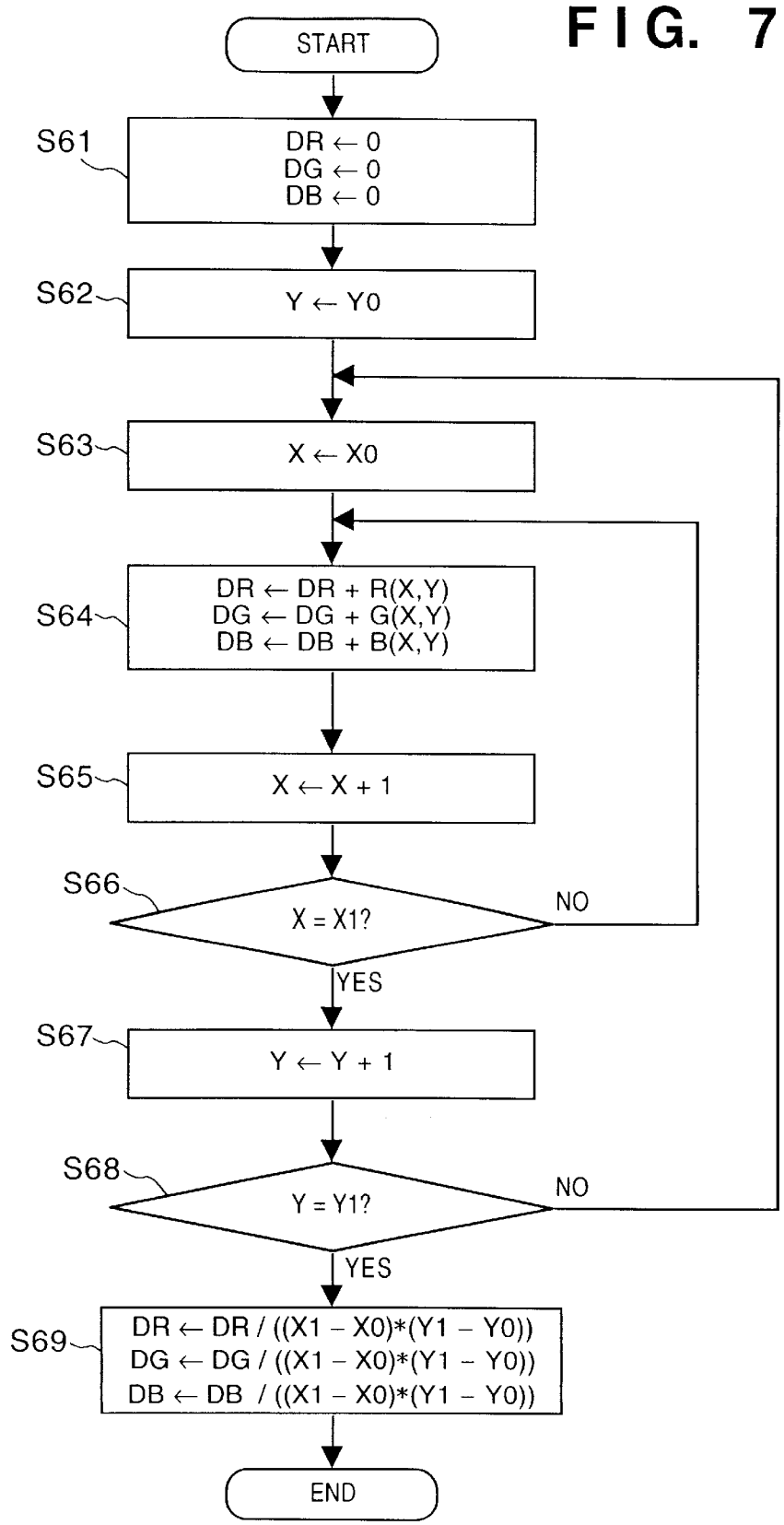
FIG. 7 is a flow chart showing the details of the method of computing the R, G, and B average values in the first embodiment.

FIG. 7 is a flow chart showing the details of the method of computing the R, G, and B average values in the first embodiment.

Assume that image data of the drawn illustration is stored in three matrices R(X, Y), G(X, Y), and B(X, Y). Note that $0 \leq X < W$ and $0 \leq Y < H$, and the start point (0, 0) is set at the upper left corner of the image. In the following flow, the R, G, and B average values of an area within the range of $X0 \leq X < X1$ and $Y0 \leq Y < Y1$ are calculated, and are respectively returned to variables DR, DG, and DB. Furthermore, since an area corresponding to the sub-area (i, j) in step S172 corresponds to:

$$X0 = W*i/3, X1 = W*(i+1)/3$$

$$Y0 = H*j/2, Y1 = H*(j+1)/2$$

the flow chart is executed after constants X0, X1, Y0, and Y1 are initialized, as described above.

In step S61, the variables DR, DG, and DB are initialized to zero. In step S62, a variable Y is initialized to Y0. In step S63, a variable X is initialized to X0. In step S64, R(X, Y) is added to the variable DR. Similarly, G(X, Y) and B(X, Y) are respectively added to the variables DG and DB.

In step S65, the variable X is incremented by "1". In step S66, the variable X is compared with X1. If X=X1 (YES in step S66), the flow advances to step S67. On the other hand, if X≠X1 (NO in step S66), the flow returns to step S64.

In step S67, the variable Y is incremented by "1". In step S68, the variable Y is compared with Y1. If Y=Y1 (YES in step S68), the flow advances to step S69. On the other hand, if Y≠Y1 (NO in step S68), the flow returns to step S63.

In step S69, the variables DR, DG, and DB are respectively divided by (X1−X0)*(Y1−Y0). This divisor indicates the number of pixels in the area. That is, the variables DR, DG, and DB indicate the average densities obtained by dividing the sum totals of pixel densities in the area by the number of pixels.

{Description of Step S173}

In step S173, the image feature amount d( ) computed in step S172 in process A is transmitted to process B via an inter-process communication. Since this process is completed within a very short period of time, even when the user continues to draw the illustration, he or she is free from any stress such as a processing speed drop or the like.

{Description of Step S174}

It is checked in step S174 if the processing end button 28 has been pressed. If the button 28 has been pressed, the processing ends. On the other hand, if the button 28 is not pressed, the flow returns to step S171, and the user can continue to draw the illustration.

{Description of Step S175}

In step S175, a loop for monitoring whether or not a communication from process A is received is formed. Upon receiving the image feature amount d( ) from process A, the flow advances to step S176.

{Description of Step S176}

In step S176, a similar image search is made based on the received image feature amount.

The hard disk device 106 stores N image data, and their image feature amounts are computed by the aforementioned process in advance and stored. Image data may be stored in a standard file format such as JPEG, FlashPix, or the like, which is known to those skilled in the art, or may be stored in a file format unique to a so-called RDBMS (relational database management system). Assume that the image feature amounts are stored in a two-dimensional matrix D(n, i) having a size N*18 (for $0 \leq n < N$, $0 \leq i < 18$).

At this time, an image distance S(n) between the drawn illustration (image data) and n-th image data stored in the hard disk device 106 is defined by:

$$S(n) = \sum_i (D(n, i) - d(i))^2$$

As this image distance S(n) is smaller, it is determined that image data has higher similarity.

Initially, the image distances S(n) (for 0≦n<N) between all the N image data stored in the hard disk device 106 and the drawn illustration (image data) are computed. Next, a similar image search is made by selecting M (0<M<N) image data in ascending order of image distance S(n). The computation process of the image distance S(n), and the similar image search process for selecting M image data will be respectively described below using FIGS. 8 and 9.

Figure 8:
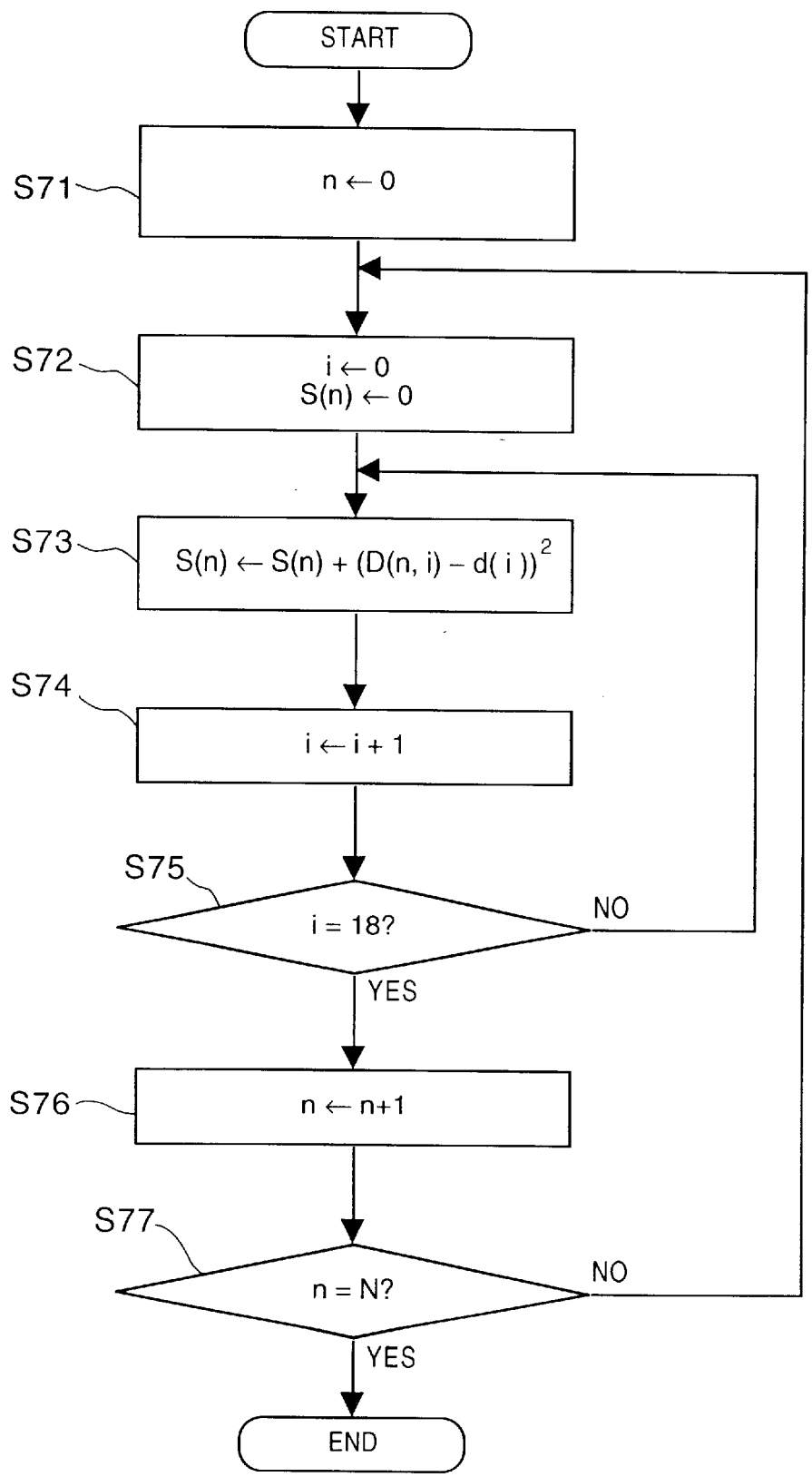
FIG. 8 is a flow chart showing the computation process of an image distance S(n) in the first embodiment.

FIG. 8 is a flow chart showing the computation process of the image distance S(n) in the first embodiment.

In step S71, a variable n is initialized to zero. In step S72, variables i and S(n) are initialized to zero. In step S73, a square of the difference between D(n, i) and d(i) is added to S(n). In step S74, the variable i is incremented by "1".

In step S75, the variable i is compared with "18". If i=18 (YES in step S75), the flow advances to step S76. On the other hand, if i≠18 (NO in step S75), the flow returns to step S73.

In step S76, the variable n is incremented by "1". In step S77, the variable n is compared with N. If n=N (YES in step S77), the processing ends. On the other hand, if n≠N (NO in step S77), the flow returns to step S72.

Upon completion of the process, the image distances S(n) between the drawn illustration (image data) and all the image data stored in the hard disk device 106 are stored in a matrix S(n). A similar image search process for selecting M image data in ascending order of image distance S(n) and storing numbers corresponding to the selected image order in a matrix T( ) will be described in detail below using FIG. 9.

Figure 9:
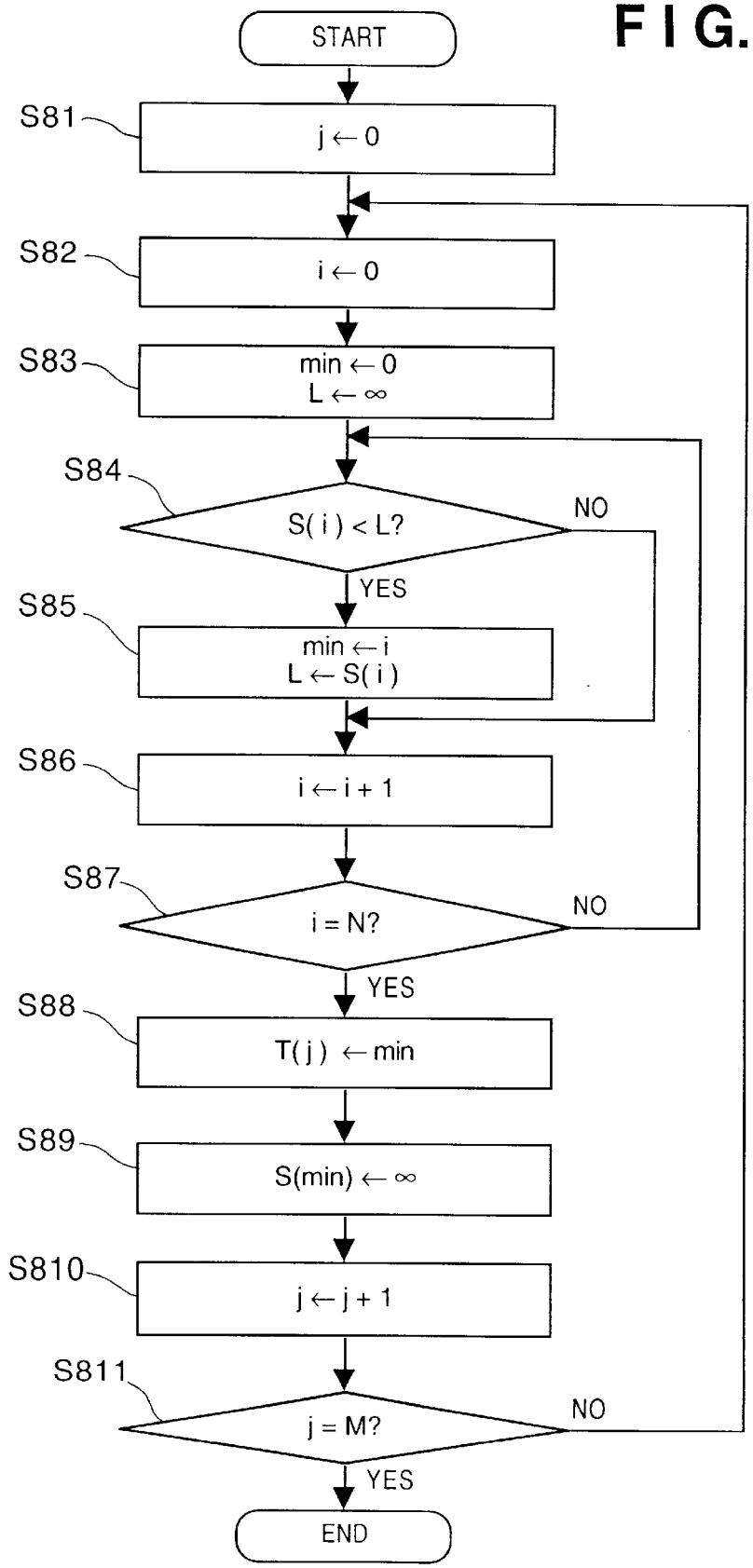
FIG. 9 is a flow chart showing the details of the similar image search process in the first embodiment.

FIG. 9 is a flow chart showing the details of the similar image search process in the first embodiment.

In step S81, a variable j is initialized to zero. In step S82, a variable i is initialized to zero. In step S83, a variable min is initialized to zero and a variable L is initialized to a sufficiently large value. In step S84, S(i) is compared with L. If S(i)<L (YES in step S84), the flow advances to step S85. On the other hand, if S(i)≧L (NO in step S84), the flow advances to step S86.

In step S85, the value i is substituted in the variable min, and S(i) is substituted in L. In step S86, the variable i is incremented by "1". In step S87, i is compared with N. If i=N (YES in step S87), the flow advances to step S88. On the other hand, if i≠N (NO in step S87), the flow returns to step S84.

In step S88, the value min is substituted in T(j). In step S89, a sufficiently large value is substituted in S(min). In step S810, the variable j is incremented by "1". In step S811, the variable j is compared with M. If j=M (YES in step S811), the processing ends. On the other hand, if j≠M (NO in step S811), the flow returns to step S82.

Upon completion of the process, the image numbers of image data stored in the hard disk device 106 are stored in the matrix T(j) (for 0≦j<M) in descending order of similarity with the drawn illustration (image data).
{Description of Step S177}

The processing contents will be explained below with reference to the control window shown in FIG. 2.

The areas 26a to 26h respectively display icon images obtained by displaying similar images found by the search process in a reduced scale. The area 26a displays an image corresponding to T(0) with highest similarity, the area 26b displays an image corresponding to T(1), . . . , and the area 26h displays an image with lowest similarity among these images.

Note that the reduced-scale display may be implemented by decoding image data stored in the hard disk device 106 and displaying the decoded image on the screen in a reduced scale. When image data has low-resolution icon data for an icon like FlashPix as a standard image format, a reduced-scale image may be displayed using that icon data.

Each icon image can be "selected" using the pointing device 102a. Upon pressing the next candidate button 27, next candidates, i.e., icon images of image data corresponding to T(8) to T(15), are displayed on the areas 26a to 26h. This operation can be repeated until T(M−1) is reached.
{Description of Step S178}

It is checked in step S178 if the processing end button 28 has been pressed. If the button 28 has been pressed, the processing ends. On the other hand, if the button 28 is not pressed, the flow returns to step S175 to wait for an inter-process communication from process A.

As described above, according to the first embodiment, since the user can draw a new illustration used as a query criteria parallel to the similar image search process, which is currently underway, the similar image search process can be efficiently done.

In the first embodiment, drawing of the illustration and the computation of the image feature amount are executed in a single process, but another method may be used. For example, the user may draw an illustration in process A, and the computation of the image feature amount, similar image search, and similar image list display may be done in process B.

In step S177, reduced-scale images corresponding to image data as the processing result of a similar image search process are displayed in a two-dimensional matrix. However, the reduced-scale images may be lined up in a horizontal array (one-dimensionally) or may be three-dimensionally displayed in consideration of information in the depth direction. For example, images with higher similarity values may be displayed on the front side (to have larger image sizes), and images with lower similarity values may be displayed on the far side (to have smaller image sizes), thus achieving a list display which is easy to understand at a glance.

Second Embodiment

Since the arrangement of an image search apparatus of the second embodiment is the same as that of the image search apparatus shown in FIG. 1 in the first embodiment, a detailed description thereof will be omitted. In this embodiment, the hard disk device 106 stores an image database managed by process B1 (to be described later), and an image database managed by process C1 (to be described later) as a plurality of image data to be searched.

The control window displayed on the display unit 103 upon executing a search process in the second embodiment will be explained below with reference to FIG. 10.

Figure 10:
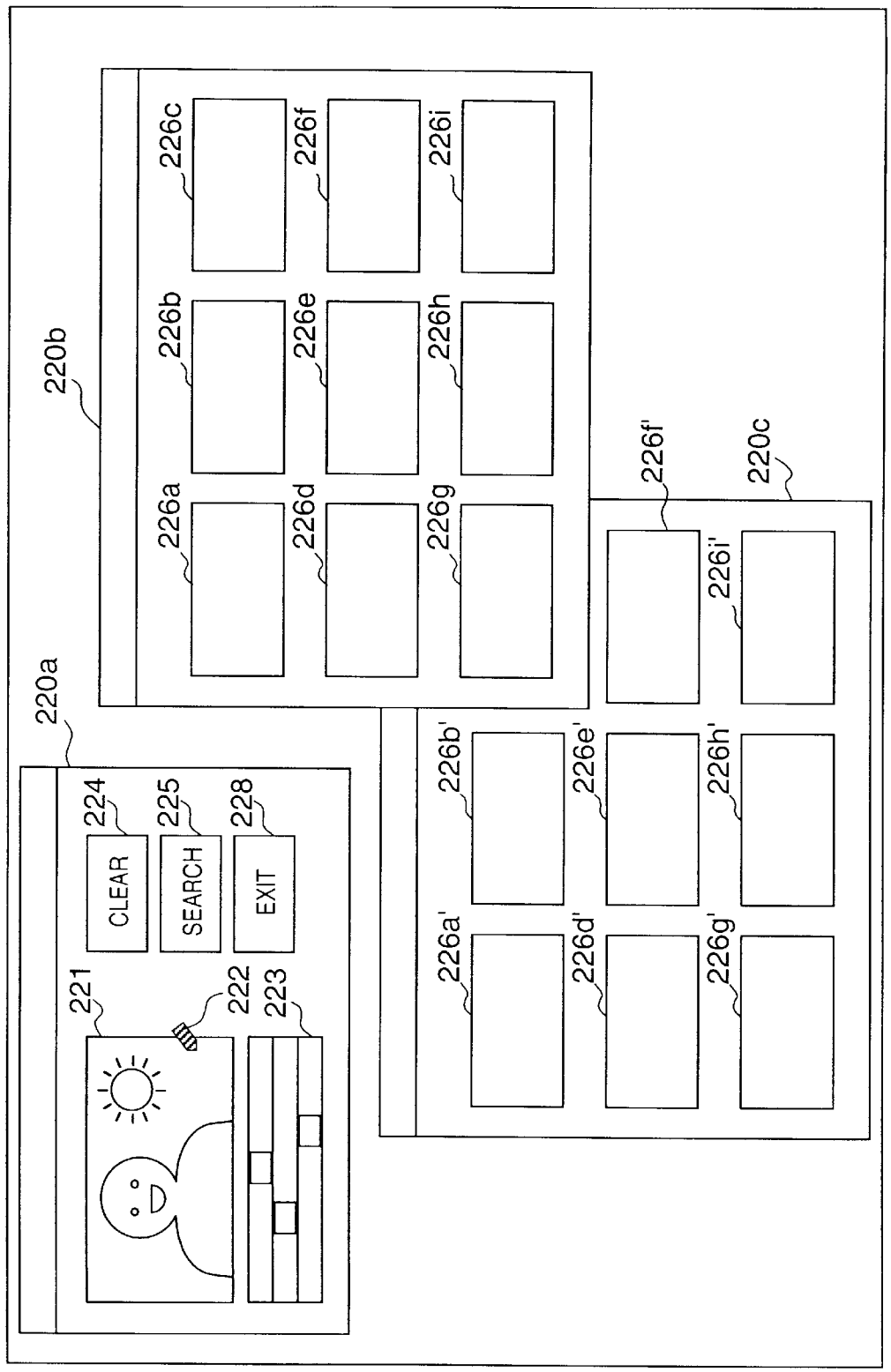
FIG. 10 shows a control window displayed on a display unit upon executing a search process of the second embodiment.

FIG. 10 shows the control window displayed on the display unit upon executing the search process in the second embodiment.

A window 220a is controlled by process A1 (to be described later). A window 220b is controlled by process B1

(to be described later). A window 220c is controlled by process C1 (to be described later). The windows 220a to 220c run on an overlapped window system represented by Windows available from Microsoft Corp., and their positions and order in the depth direction can be changed by user operation using the pointing device 102a. Since the operation of the window system itself is known to those who are skilled in the art, a detailed description thereof will be omitted.

Reference numeral 221 denotes a user drawing area; 222, a cursor; 223, color selection scroll bars; 224, a clear button; 225, a search button; and 226a to 226i areas for displaying icon images corresponding to image data as search results of process B1. Reference numerals 226a' to 226i' denote areas for displaying icon images corresponding to image data as search results of process C1. In FIG. 10, the area 226c' is hidden behind the window 220b. This area can be displayed by moving the window 220c in front of the window 220b.

The user can draw an illustration, which is similar to the image wanted and used as a query criteria, on the user drawing area 221 using the drawing tools implemented by software. The software process upon drawing an illustration will be briefly described below.

The color selection scroll bars 223 are used for selecting a pen color used in drawing, and designate R, G, and B values in turn from the uppermost one. Upon pressing the clear button 224, the entire user drawing area 221 is painted in white. The user moves the cursor 222 using the pointing device 102a and can draw a free curve on the user drawing area 221. Upon pressing the processing end button 228, the control window is closed, and the processing ends.

An outline of the processes executed by the image search apparatus of the second embodiment will be described blow with reference to FIGS. 11A to 11C.

Figure 11A:
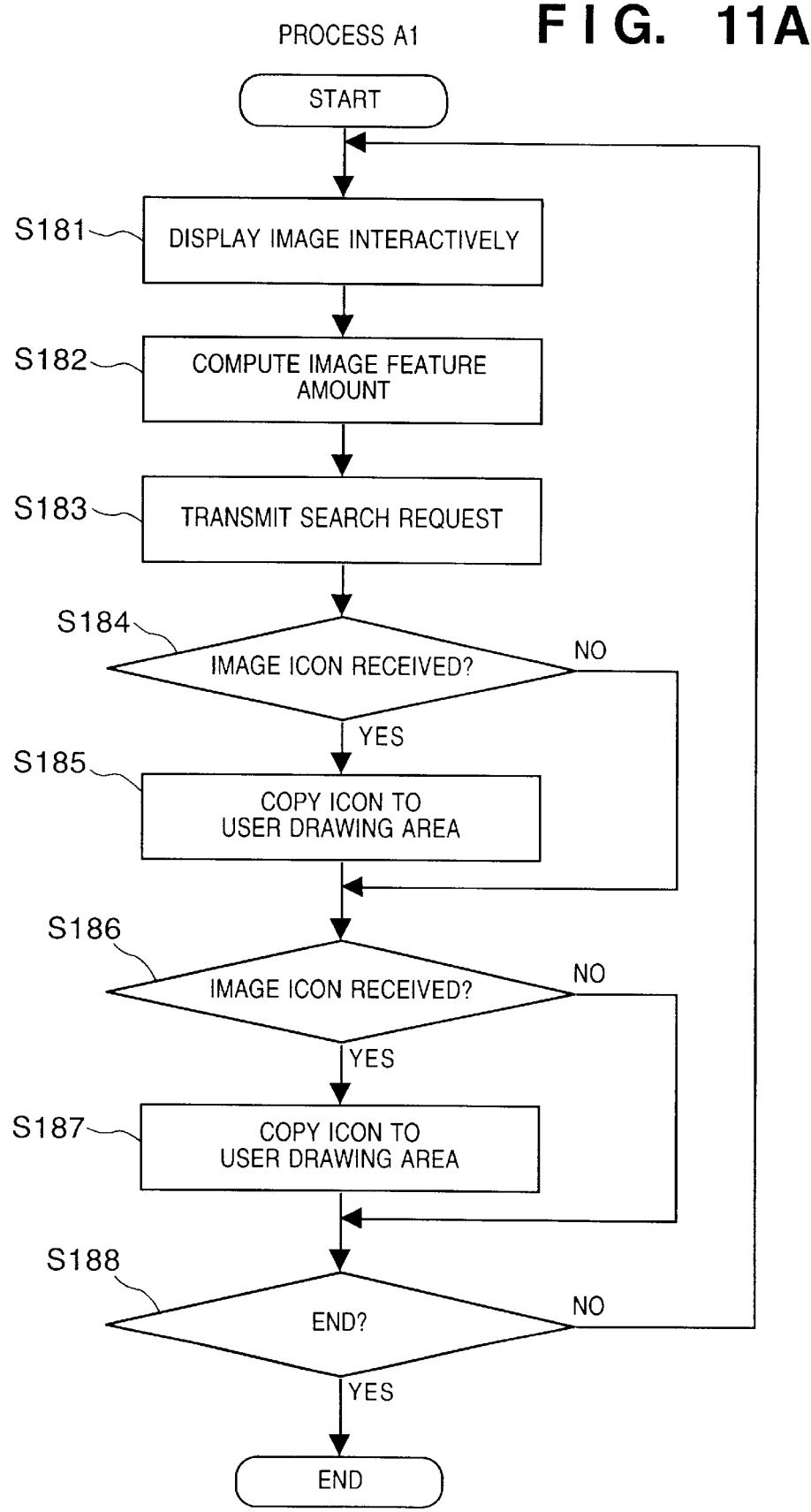
FIG. 11A is a flow chart showing an outline of the processes executed by an image search apparatus of the second embodiment.
Figure 11B:
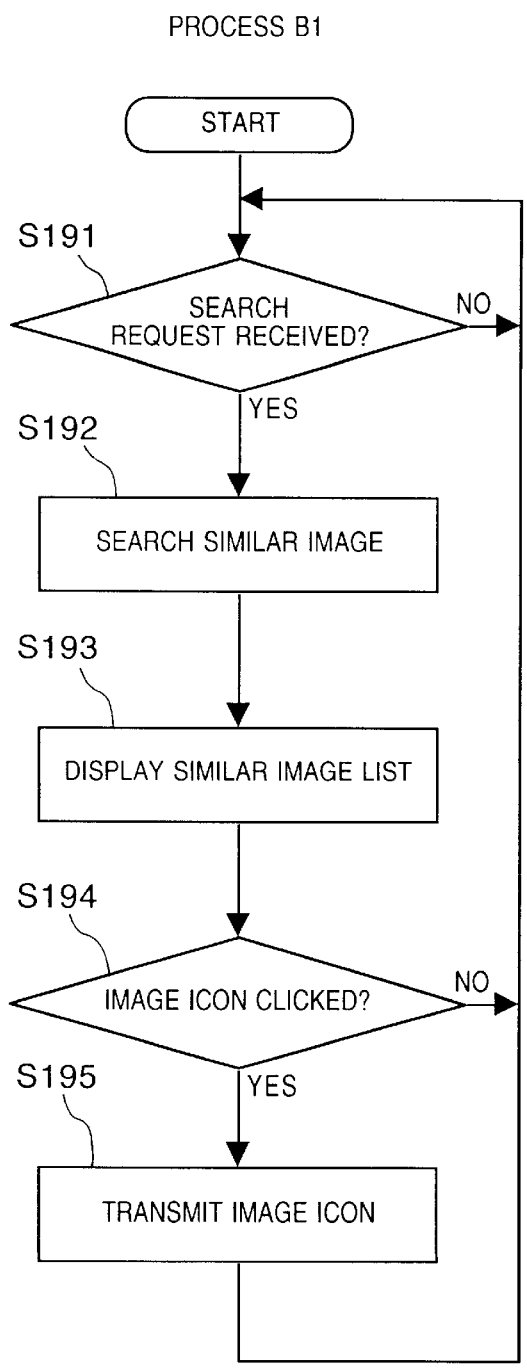
FIG. 11B is a flow chart showing an outline of the processes executed by the image search apparatus of the second embodiment.
Figure 11C:
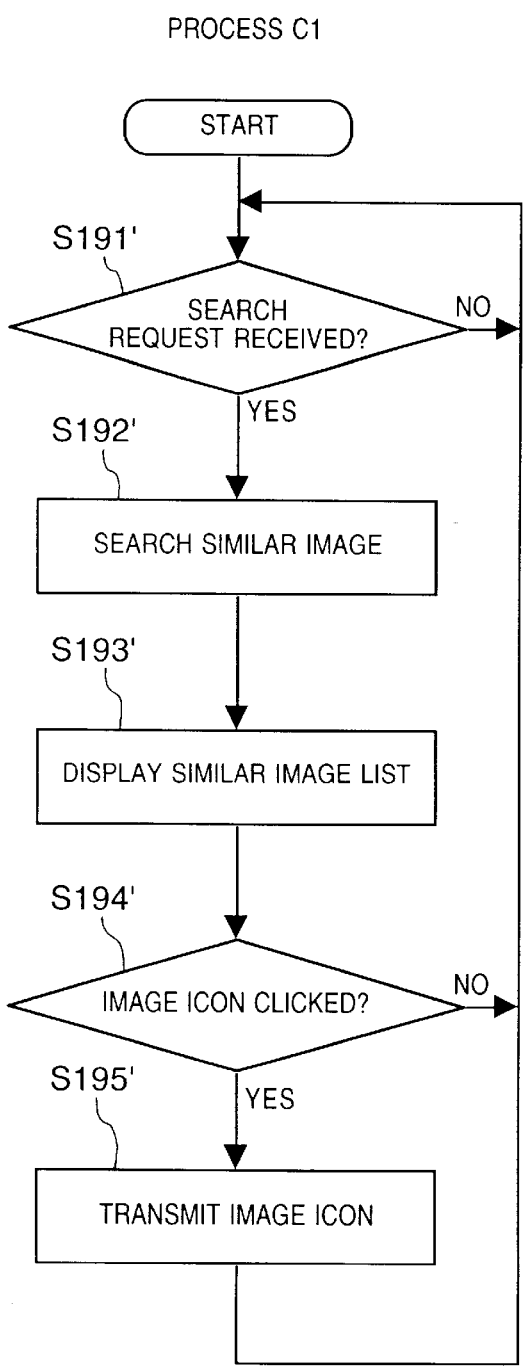
FIG. 11C is a flow chart showing an outline of the processes executed by the image search apparatus of the second embodiment.

FIGS. 11A to 11C are flow charts showing an outline of the processes executed by the image search apparatus of the second embodiment.

Processes A1, B1, and C1 are parallelly executed while communicating with each other. Such processes are implemented by a multi-process OS represented by UNIX or the like. These processes may be implemented in fine control units, or may be implemented by hardware, threads or the like.

The processes executed in process A1 will be explained below with reference to FIG. 11A.

In step S181, the user draws an illustration, which is similar to the image data wanted and stored on the hard disk device 106, and is used as a query criteria, on the display unit 103. In step S182, the image feature amount of the drawn illustration is computed. In step S183, the computed image feature amount is passed to processes B1 and C1 via an inter-process communication.

It is checked in step S184 if an icon image is received from process B1. If an icon image is received (YES in step S184), the flow advances to step S185 to copy the received icon image on the user drawing area 221. On the other hand, if an icon image is not received (NO in step S184), the flow advances to step S186.

It is checked in step S186 if an icon image is received from process C1. If an icon image is received (YES in step S186), the flow advances to step S187 to copy the received icon image on the user drawing area 221. On the other hand, if an icon image is not received (NO in step S186), the flow advances to step S188.

It is checked in step S188 if search operation is to end. If search operation is not to end (NO in step S188), the flow returns to step S181. On the other and, if search operation is to end (YES in step S188), the processing ends.

The processes executed in process B1 will be explained below with reference to FIG. 11B.

It is checked in step S191 if an inter-process communication (image feature amount) from process A1 is received. If the image feature amount is not received (NO in step S191), the flow returns to step S191. That is, a loop for monitoring the inter-process communication is formed. On the other hand, if the image feature amount is received (YES in step S191), the flow advances to step S192.

In step S192, a similar image search is made on the basis of the received image feature amount. In step S193, similar images found by search are displayed on the areas 226a to 226i of the window 220b. It is checked in step S194 if one of the icon images on the areas 226a to 226i is clicked by the pointing device 102a. If no icon image is clicked (NO in step S194), the flow returns to step S191. On the other hand, if one icon image is clicked, the flow advances to step S195 to transmit the clicked icon image to process A1. After transmission, the flow returns to step S191 to wait for an inter-process communication from process A1.

In process C1, operations equivalent to those in process B1 are executed. That is, steps S191' to S195' respectively correspond to steps S191 to S195. In this process, however, similar images found by search are displayed on the window 22c, and image data and their image amounts are different from those of image data in the image database managed by process B1.

With the aforementioned processes, the user can search the image databases for image data by only drawing an illustration similar to a desired image using the window 220a controlled by process A1. Also, the user can copy one of icon images displayed by process B1 or C1 to the user drawing area 221. For example, the user can search the image database of process C1 for an image using an image, which is modified by him or her on the basis of one image data contained in the image database of process B1, as a query criteria, and vice versa.

The details of the processes executed in the individual steps will be described below.

{Description of Step S181}

In step S181, the user draws an illustration, which is used as a query criteria, on the user drawing area 221, and the flow advances to the next step S182 at an appropriate timing. Since the process at that time is the same as that shown in FIG. 4 in the first embodiment, a detailed description thereof will be omitted.

{Description of Step S182}

In step S182, the image feature amount of the illustration drawn in step S181 is computed. Since the image feature amount, the computation process of the image feature amount, and the method of computing the R, G, and B average values are the same as those shown in FIGS. 5 to 7 in the first embodiment, a detailed description thereof will be omitted.

{Description of Step S183}

In step S183, the image feature amount d( ) computed in step S182 in process A1 is transmitted to processes B1 and C1 via an inter-process communication. Since this process is completed within a very short period of time, even when the user continues to draw the illustration, he or she is free from any stress such as a processing speed drop or the like.

{Description of Steps S184 to S187}

In steps S184 to S187, it is checked if an icon image is received from process B1 or C1. If an icon image is received, the received icon image is copied to the user drawing area 221. With this process, a similar image search can be made using, as a query criteria, an image obtained by modifying the icon image, which is obtained during the search. Also, the above-mentioned processes can be executed across a plurality of image databases.

{Description of Step S188}

It is checked in step S188 if the processing end button 28 has been pressed. If the button 28 has been pressed, the processing ends. On the other hand, if the button 28 is not pressed, the flow returns to step S181, and the user can continue to draw the illustration.

{Description of Step S191}

As has been described above, processes B1 and C1 have the same processing contents. That is, since the processes in steps S191 to S195 are the same as those in steps S191' to S195', a detailed description of the latter processes will be omitted except for especially required cases.

In step S191, a loop for monitoring whether or not a communication from process A1 is received is formed. Upon receiving the image feature amount d( ) from process A1, the flow advances to step S192.

{Description of Step S192}

In step S192, a similar image search is made based on the received image feature amount. Since the similar image search process is the same as that shown in FIGS. 8 and 9 in the first embodiment, a detailed description thereof will be omitted.

{Description of Step S193}

The processing contents will be explained below with reference to the control window shown in FIG. 10.

The areas 226a to 226i respectively display icon images obtained by displaying similar images found by the search process in a reduced scale. The area 226a displays an image corresponding to T(0) with highest similarity, the area 226b displays an image corresponding to T(1), . . . , and the area 226i displays an image with lowest similarity among these images.

Note that the reduced-scale display may be implemented by decoding image data stored in the hard disk device 106 and displaying the decoded image on the screen in a reduced scale. When image data has low-resolution icon data for an icon like FlashPix as the standard image format, a reduced-scale image may be displayed using that icon data.

{Description of Step S194}

It is checked in step S194 if one of the icon images displayed on the areas 226a to 226i is clicked by the pointing device 102a. On the other hand, if one icon image is clicked, the corresponding icon image is transmitted to the process A1 in step S195, and the flow then returns to step S191.

As described above, according to the second embodiment, when the user selects one, close to a desired image, from a list of icon images displayed as search results, the selected icon image is copied to the user drawing area 221. When the user adds strokes to the copied image, a desired image can be efficiently found by search. Since the above operations can be done across a plurality of image databases, the work efficiency can be improved compared to searches for different image databases.

In the second embodiment, processes A1, B1, and C1 are divisionally executed. When processes A1 and B1 are combined, the number of processes can be reduced. In this case, the entire processing can be divided into a main process including drawing of an illustration, a similar image search, and search result display, and a sub process including only a similar image search and search result display. In such case, the response of the processing upon drawing an illustration is somewhat impaired, but the load on the system can be reduced.

An icon image is transmitted from process B1 or C1 to process A1. However, the present invention is not limited to this. For example, processes B1 and C1 may directly exchange icon images without the intervention of process A including drawing of an illustration.

In the above example, two image databases are simultaneously searched. However, by only increasing the number of processes which are the same as process B1, an arbitrary number of image databases can be simultaneously searched. The number of processes need not be determined in advance, and many processes can be started or only a given process can be quitted according to user's decision.

In step S193 or S193', reduced-scale images corresponding to image data as the processing result of the similar image search process are displayed in a two-dimensional matrix. However, the reduced-scale images may be lined up in a horizontal array (one-dimensionally) or may be three-dimensionally displayed in consideration of information in the depth direction. For example, images with higher similarity values may be displayed on the front side (to have larger image sizes), and images with lower similarity values may be displayed on the far side (to have smaller image sizes), thus achieving a list display which is easy to understand at a glance.

In the first and second embodiments, the system arrangement includes only one CPU 101. However, in case of applications that parallelly execute a plurality of processes like the present invention, the system response can be effectively improved using a so-called multi-processor system having a plurality of CPUs.

Third Embodiment

FIG. 12 is a block diagram showing the arrangement of an image search system of the third embodiment.

Referring to FIG. 12, reference numerals 1a to 1d denote client computers; and 11, a server computer. These client and server computers are connected to each other via a network 12, and can communicate with each other. The client computers 1a to 1d and server computer 11 have the same hardware arrangement. The arrangement of the client computer 1a will be described below as a representative one.

FIG. 12 shows four client computers 1a to 1d. In general, an arbitrary number of client computers are connected to the network 12. The number of server computers 11 is not limited to one, and an arbitrary number of server computers are connected to the network 12. For example, in some configurations, different server computers may be used in units of image databases, or a plurality of server computers may provide image databases with identical contents due to, e.g., geometrical reasons. Since the arrangement of the network 12 is known to those who are skilled in the art, a detailed description thereof will be omitted. If the network 12 is a LAN (local area network), this embodiment can be applied to a so-called intra-network; if the network 12 is a WAN (wide area network), this embodiment can be applied to the Internet.

In the arrangement of the client computer 1a, the same reference numerals denote the same parts as those in FIG. 1 in the first embodiment, and a detailed description thereof will be omitted.

In the client computer 1a, reference numeral 109 denotes a network connection device for connecting the computer to the network 12. A hard disk device 106 stores an image database managed by process B2 (to be described later), and an image database managed by process C2 (to be described later) as a plurality of image to be searched.

Since the control window display on a display unit 103 of the client computer upon executing a search process of the third embodiment is the same as that shown in FIG. 2 in the first embodiment, a detailed description thereof will be omitted.

An outline of the processes executed by the image search apparatus of the third embodiment will be described blow with reference to FIGS. 13A and 13B.

FIGS. 13A and 13B are flow charts showing an outline of the processes executed by the image search apparatus of the third embodiment.

A server process to be described below is implemented on the server computer 11, and a client process is implemented on one of the client computers 1a to 1d.

The processes executed in the client process will be explained below with reference to FIG. 13A.

In step S271, the user draws an illustration, which is similar to the image data wanted and stored on the hard disk device 106, and is used as a query criteria, on the display unit 103. In step S272, the image feature amount of the drawn illustration is computed. In step S273, the computed image feature amount is passed to the server process via an inter-computer communication. It is checked in step S274 if similar images as search results are received from the server process via an inter-computer communication. If similar images are not received (NO in step S274), the flow returns to step S274. That is, a loop for monitoring the inter-computer communication is formed. On the other hand, if similar images are received (YES in step S274), the flow advances to step S275 to display the received similar images as search results.

It is checked in step S276 if search operation is to end. If search operation is not to end (NO in step S276), the flow returns to step S271. On the other hand, if search operation is to end (YES in step S276), the processing ends.

The processes executed in the server process will be explained below with reference to FIG. 13B.

It is checked in step S277 if an inter-computer communication (image feature amount) from the client process is received. If an image feature amount is not received (NO in step S277), the flow returns to step S277. That is, a loop for monitoring the inter-computer communication is formed. On the other hand, if an image feature amount is received (YES in step S277), the flow advances to step S278.

In step S278, a similar image search is made on the basis of the received image feature amount. In step S279, similar images found by search are transmitted to the client process via an inter-computer communication.

With the above processes, an illustration used as a query criteria can be drawn on the client computer, a similar image search can be made on the server computer on the basis of the query criteria, and the search results can be displayed on the client computer.

The details of the processes executed in the individual steps will be described below.

{Description of Step S271}

In step S271, the user draws an illustration, which is used as a query criteria, on the user drawing area 21, and the flow advances to the next step S272 at an appropriate timing. Since the process at that time is the same as that shown in FIG. 4 in the first embodiment, a detailed description thereof will be omitted.

{Description of Step S272}

In step S272, the image feature amount of the illustration drawn in step S271 is computed. Since the image feature amount, the computation process of the image feature amount, and the method of computing the R, G, and B average values are the same as those shown in FIGS. 5 to 7 in the first embodiment, a detailed description thereof will be omitted.

{Description of Step S273}

In step S273, the image feature amount d( ) computed in step S272 in the client process is transmitted to the server process via an inter-computer communication. Since this process transmits not the illustration itself as a query criteria but its image feature amount alone, the data size flowing on the network 12 can be greatly reduced, and the load on the network 12 can be suppressed.

{Description of Step S274}

In step S274, a loop for monitoring whether or not the inter-computer communication from the server process is received is formed. Upon receiving similar images corresponding to a matrix To (to be described later) as search results, the flow advances to step S275.

{Description of Step S275}

The processing contents will be explained below with reference to the control window shown in FIG. 2.

The areas 26a to 26h respectively display icon images obtained by displaying similar images found by the search process in a reduced scale. The area 26a displays an image corresponding to T(0) with highest similarity, the area 26b displays an image corresponding to T(1), . . . , and the area 26h displays an image with lowest similarity among these images.

Since image data corresponding to icon images are stored in the hard disk device 106 of the server computer 11, image data are sent from the server computer 11 to each client computer as needed. When a search is repeated, since identical image data must be displayed repeatedly, image data may be cached on the client computer as needed.

Note that the reduced-scale display may be implemented by decoding image data stored in the hard disk device 106 of the server computer 11 and displaying the decoded image on the screen in a reduced scale. When image data has low-resolution icon data for an icon like FlashPix as the standard image format, a reduced-scale image may be displayed using that icon data.

Each icon image can be "selected" using the pointing device 102a. Upon pressing the next candidate button 27, next candidates, i.e., icon images of image data corresponding to T(8) to T(15), are displayed on the areas 26a to 26h. This operation can be repeated until T(M−1) is reached.

{Description of Step S276}

It is checked in step S276 if the processing end button 28 is pressed. If the button 28 has been pressed, the processing ends. On the other hand, if the button 28 has not been pressed, the flow returns to step S271, and the user can continue to draw the illustration.

{Description of Step S277}

In step S277, a loop for monitoring whether or not a communication from the client process is received is formed. Upon receiving an image feature amount d( ) from the client process, the flow advances to step S278.

{Description of Step S278}

In step S278, a similar image search is made based on the received image feature amount. Since the similar image search process is the same as that shown in FIGS. 8 and 9 in the first embodiment, a detailed description thereof will be omitted.

{Description of Step S279}

In step S279, similar images corresponding to the matrix To as search results are sent to the client process via an inter-computer communication, and the flow then returns to step S277 to wait for the next inter-computer communication.

In FIGS. 13A and 13B, the processes executed for only one client process have been explained. However, since the client process can be implemented on a plurality of client computers, it is necessary to monitor communication requests from all the client computers in step S279. To this end, the server computer 11 parallelly executes a plurality of server processes to be able to respond to requests from a plurality of client computers at the same time.

As described above, according to the third embodiment, a client/server type similar image search system can be built with respect to the image database managed in the system. For this reason, a client/server type search system can be built on the basis of the image database simultaneously managed by a server. Upon changing an algorithm for implementing the similar image search process or correcting its bugs, when only the algorithm that is managed on the server computer 11 is corrected, the correction contents can be reflected in the entire system. Even when the client computer has low performance, since principal processes are executed by server computer, a high-performance similar image search system can be realized. Since the algorithm for implementing the similar image search process can not be handled by any user on the client computer, a similar image search system that can assure high security can be realized.

Since the user can draw a new illustration used as a query criteria parallel to the similar image search process which is currently underway, the similar image search process can be efficiently done.

In the third embodiment, icon images displayed on the client computer as search results are stored in the server computer. Alternatively, icon images may be stored in the client computer as needed. In this case, image data corresponding to the icon images are stored in the server computer, and image data are sent to the client computer as needed. That is, since the client computer need only store icon images, the storage capacity of an external storage device for storing the full-size images can be saved.

In this arrangement, the server computer can inform the client computer of similar image search results using not icon images but image IDs having a smaller data size than the icon images. The client computer can search and display corresponding icon images using the received image IDs. In this case, search results can be informed at high speed, and searched images can be displayed on the client computer at higher speed.

When a removable medium such as a CD-ROM or the like is used as an external storage device for storing icon images, the removable medium can be loaded into the client computer only when a similar image search is made. Hence, the storage capacity of the external storage device used in the client computer can be saved.

In step S275, reduced-scale images corresponding to image data as the processing result of the similar image search process are displayed in a two-dimensional matrix. However, the reduced-scale images may be lined up in a horizontal array (one-dimensionally) or may be three-dimensionally displayed in consideration of information in the depth direction. For example, images with higher similarity values may be displayed on the front side (to have larger image sizes), and images with lower similarity values may be displayed on the far side (to have smaller image sizes), thus achieving a list display which is easy to understand at a glance.

In the first to third embodiments, the mouse is used as the pointing device 102a. However, the present invention is not limited to such specific pointing device. For example, when a pen tablet that allows pen input is used, the operator can efficiently draw an illustration. Also, when a touch screen, which is integrated with the display unit 103 and allows the user to directly draw an illustration while observing the displayed window, is used, more intuitive drawing can be achieved. In addition, any other pointing devices may be used as long as they can input information to the computer system.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, the storage medium stores program codes corresponding to the flow charts shown in FIGS. 3A and 3B, FIGS. 6 to 9, FIGS. 11A to 11C, and FIGS. 13A and 13B.

As many apparently widely different embodiments of the present invention can be made without departing from the spirit and scope thereof, it is to be understood that the invention is not limited to the specific embodiments thereof except as defined in the appended claims.

What is claimed is:

1. An image search apparatus for searching an image database that stores a plurality of image data comprising:

first control means for controlling execution of an input means for inputting an image using an input window, and image feature amount computing means for computing an image feature amount of the image input by said input means;

second control means for controlling execution of image similarity computing means for computing image similarity on the basis of the image feature amount computed by said image feature amount computing means and image feature amounts of image data stored in a storage medium and image display means for displaying a list of image data as search results on the basis of the image similarity computed by said image similarity computing means; and third control means for processing, in parallel, control processes of said first and second control means, and controlling a communication between said first and second control means, wherein said image feature amount computing means computes the image feature amount of the drawn image every time the image is modified by said input means, and wherein each of said first and second control means is implemented, in parallel, by different processes in a multi-process OS.

2. The apparatus according to claim 1, wherein said third control means further controls to display the input window and a display window displayed by said image display means on a single window of a display unit.

3. An image search apparatus for searching an image database that stores a plurality of image data comprising:

first control means for controlling execution of an input means for inputting an image using an input window;

second control means for controlling execution of image feature amount computing means for computing an image feature amount of the image input by said input means, image similarity computing means for computing image similarity on the basis of the image feature amount computed by said image feature amount computing means, and image feature amounts of image data stored in a storage medium and image display means for displaying a list of image data as search results on the basis of the image similarity computed by said image similarity computing means; and third control means for processing, in parallel, control processes of said first and second control means, and controlling a communication between said first and second control means, wherein said image feature amount computing means computes the image feature amount of the drawn image every time the image is modified by said input means, and wherein each of said first and second control means is implemented, in parallel, by different processes in a multi-process OS.

4. The apparatus according to claim 3, wherein said third control means further controls to display the input window and a display window displayed by said image display means on a single window of a display unit.

5. An image search apparatus for searching an image database that stores a plurality of image data comprising:

first control means for controlling execution of an input means for inputting an image using an input window;

second control means for controlling execution of image feature amount computing means for computing an image feature amount of the image input by said input means;

third control means for controlling execution of image similarity computing means for computing image similarity on the basis of the image feature amount computed by said image feature amount computing means and image feature amounts of image data stored in a storage medium, image display means for displaying a list of image data as search results on the basis of the image similarity computed by said image similarity computing means; and fourth control means for processing, in parallel, control processes of said first, second, and third control means, and controlling a communication among said first, second, and third control means, wherein said image feature amount computing means computes the image feature amount of the drawn image every time the image is modified by said input means, and wherein each of said first and second control means is implemented, in parallel, by different processes in a multi-process OS.

6. The apparatus according to claim 5, wherein said fourth control means further controls to display the input window and a display window displayed by said image display means on a single window of a display unit.

7. A method of controlling an image search apparatus for searching an image database that stores a plurality of image data comprising:

a control step, of processing, in parallel, first and second processes, and controlling a communication between the first and second processes, the first process comprising:

an input step, of inputting an image input on an input window; and an image feature amount computing step, of computing an image feature amount of the image input in said input step, and the second process comprising:

an image similarity computing step, of computing image similarity on the basis of the image feature amount computed in said image feature amount computing step and image feature amounts of image data stored in a storage medium; and an image display step, of displaying a list of image data as search results on the basis of the image similarity computed in said image similarity computing step, wherein said image feature amount computing step computes the image feature amount of the drawn image every time the image is modified by said input step, and wherein each of said first and second control process is implemented, in parallel, by different processes in a multi-process OS.

8. The method according to claim 7, wherein said control step includes a step of further controlling to display the input window and a display window displayed in said image display step on a single screen of a display unit.

9. A method of controlling an image search apparatus for searching an image database that stores a plurality of image data comprising:

a control step, of processing, in parallel, first and second processes, and controlling a communication between the first and second processes, the first process comprising:

an input step, of inputting an image input on an input window, and the second process comprising:

an image feature amount computing step, of computing an image feature amount of the image input in said input step;

an image similarity computing step, of computing image similarity on the basis of the image feature amount computed in said image feature amount computing step and image feature amounts of image data stored in a storage medium; and an image display step, of displaying a list of image data as search results on the basis of the image similarity computed in said image similarity computing step, wherein said image feature amount computing step computes the image feature amount of the drawn image every time the image is modified by said input step, and wherein each of said first and second control process is implemented, in parallel, by different processes in a multi-process OS.

10. The method according to claim 9, wherein said control step includes a step of further controlling to display the input window and a display window displayed in said image display step on a single screen of a display unit.

11. A method of controlling an image search apparatus for searching an image database that stores a plurality of image data comprising:

a control step, of processing, in parallel, first, second, and third processes, and controlling a communication among the first, second, and third processes, the first process comprising:
an input step, of inputting an image input on an input window, the second process comprising:
an image feature amount computing step, of computing an image feature amount of the image input in said input step, and the third process comprising:
an image similarity computing step, of computing image similarity on the basis of the image feature amount computed in said image feature amount computing step and image feature amounts of image data stored in first storage medium; and an image display step, of displaying a list of image data as search results on the basis of the image similarity computed in said image similarity computing step, wherein said image feature amount computing step computes the image feature amount of the drawn image every time the image is modified by said input step, and wherein each of said first and second control process is implemented, in parallel, by different processes in a multi-process OS.

12. The method according to claim 11, wherein said control step includes a step of further controlling to display the input window and a display window displayed in said image display step on a single screen of a display unit.

13. A computer readable memory that stores a program code of a method of controlling an image search apparatus for searching an image database that stores a plurality of image data comprising:

a program code of a control step of processing, in parallel, first and second processes, and controlling a communication between the first and second processes, the first process comprising:
a program code of an input step of inputting an image input on an input window; and
a program code of an image feature amount computing step of computing an image feature amount of the image input in the input step, and the second process comprising:
a program code of an image similarity computing step of computing image similarity on the basis of the image feature amount computed in the image feature amount computing step and image feature amounts of image data stored in a storage medium; and a program code of an image display step of displaying a list of image data as search results on the basis of the image similarity computed in the image similarity computing step, wherein the image feature amount computing step computes the image feature amount of the drawn image every time the image is modified by the input step, and wherein each of the first and second control process is implemented, in parallel, by different processes in a multi-process OS.

14. A computer readable memory that stores a program code of a method of controlling an image search apparatus for searching an image database that stores a plurality of image data comprising:

a program code of a control step of processing, in parallel, first and second processes, and controlling a communication between the first and second processes, the first process comprising:
a program code of an input step of inputting an image input on an input window, and the second process comprising:
a program code of an image feature amount computing step of computing an image feature amount of the image input in the input step;
a program code of an image similarity computing step of computing image similarity on the basis of the image feature amount computed in the image feature amount computing step and image feature amounts of image data stored in a storage medium; and
a program code of an image display step of displaying a list of image data as search results on the basis of the image similarity computed in the image similarity computing step, wherein the image feature amount computing step computes the image feature amount of the drawn image every time the image is modified by the input step, and wherein each of the first and second control process is implemented, in parallel, by different processes in a multi-process OS.

15. A computer readable memory that stores a program code of a method of controlling an image search apparatus for searching an image database that stores a plurality of image data comprising:

a program code of a control step of processing, in parallel, first, second, and third processes, and controlling a communication among the first, second, and third processes, the first process comprising:
a program code of an input step of inputting an image input on an input window, the second process comprising:
a program code of an image feature amount computing step of computing an image feature amount of the image input in the input step, and the third process comprising:
a program code of an image similarity computing step of computing image similarity on the basis of the image feature amount computed in the image feature amount computing step and image feature amounts of image data stored in a storage medium; and a program code of an image display step of displaying a list of image data as search results on the basis of the image similarity computed in the image similarity computing step, wherein the image feature amount computing step computes the image feature amount of the drawn image every time the image is modified by the input step, and wherein each of the first and second control process is implemented, in parallel, by different processes in a multi-process OS.

16. An image search apparatus for searching an image database that stores a plurality of image data comprising:

control means for processing, in parallel, at least three processes (first to third processes), and controlling a communication among the first to third processes, the first process controlling execution of:
input means for inputting an image using an input window; and
image feature amount computing means for computing an image feature amount of the image input by said input means, the second process controlling execution of:
first image similarity computing means for computing image similarity on the basis of the image feature amount computed by said image feature amount computing means and image feature amounts of image data stored in a first storage medium; and
first image display means for displaying a list of image data as search results on the basis of the image similarity computed by said first image similarity computing means, and the third process controlling execution of:
second image similarity computing means for computing image similarity on the basis of the image feature amount computed by said image feature amount computing means and image feature amounts of image data stored in a second storage medium; and
second image display means for displaying a list of image data as search results on the basis of the image similarity computed by said second image similarity computing means, wherein said image feature amount computing means computes the image feature amount of the drawn image every time the image is modified by said input means, and wherein each of said first to third process is implemented, in parallel, by different processes in a multi-process OS.

* * * * *